United States Patent
Ethridge et al.

(10) Patent No.: US 10,961,787 B2
(45) Date of Patent: Mar. 30, 2021

(54) ENHANCED WELDED PIPE, THREADED CONNECTIONS, AND METHODS FOR ACHIEVING THE SAME

(71) Applicant: National Oilwell Vareo, L.P., Houston, TX (US)

(72) Inventors: Roger Edward Ethridge, Houston, TX (US); Christopher E. Desadier, Conroe, TX (US)

(73) Assignee: National Oilwell Varco, L.P., Houston, TX (US)

( * ) Notice: Subject to any disclaimer, the term of this patent is extended or adjusted under 35 U.S.C. 154(b) by 219 days.

(21) Appl. No.: 15/883,722

(22) Filed: Jan. 30, 2018

(65) Prior Publication Data

US 2018/0216416 A1    Aug. 2, 2018

Related U.S. Application Data

(60) Provisional application No. 62/452,103, filed on Jan. 30, 2017.

(51) Int. Cl.
*B23K 15/00*    (2006.01)
*B21C 37/08*    (2006.01)
(Continued)

(52) U.S. Cl.
CPC ........ *E21B 17/042* (2013.01); *B21C 37/0811* (2013.01); *B23K 15/0053* (2013.01);
(Continued)

(58) Field of Classification Search
CPC ......... Y10T 29/49718; Y10T 29/49719; Y10T 29/49721; Y10T 29/49723;
(Continued)

(56) References Cited

U.S. PATENT DOCUMENTS

| 2,504,509 A | * | 4/1950 | Erickson | B23P 6/04 228/119 |
| 2,795,523 A | * | 6/1957 | Cobb | B29C 73/00 156/94 |

(Continued)

FOREIGN PATENT DOCUMENTS

WO    00/73693 A1    12/2000

OTHER PUBLICATIONS

"XL Systems Engineered Connections," National Oilwell Varco, L.P., www.nov.com/xlsystems (2013) (20 p.).
(Continued)

*Primary Examiner* — Sarang Afzali
*Assistant Examiner* — Darrell C Ford
(74) *Attorney, Agent, or Firm* — Conley Rose, P.C.

(57) ABSTRACT

A tubular member includes a tube body, a tube end, an exterior surface, an interior surface, a nominal wall thickness, a longitudinal axis, a welded seam, and a patch of material. The welded seam forms an arcuate portion of the interior surface, and the patch covers a portion of the interior surface that includes a portion of the welded seam, extending from the tube end to an axially spaced first location. The resulting interior surface from the tube end to the axially spaced first location has a uniform inside diameter.

34 Claims, 11 Drawing Sheets

(51) Int. Cl.
*E21B 17/042* (2006.01)
*F16L 15/06* (2006.01)
*F16L 9/04* (2006.01)
*F16L 15/00* (2006.01)
*E21B 17/00* (2006.01)

(52) U.S. Cl.
CPC ............... *E21B 17/00* (2013.01); *F16L 9/04* (2013.01); *F16L 15/001* (2013.01); *F16L 15/06* (2013.01)

(58) Field of Classification Search
CPC ......... Y10T 29/49725; Y10T 29/49726; Y10T 29/49728; Y10T 29/49732; Y10T 29/4973; Y10T 29/49734; Y10T 29/49737; Y10T 29/49742; Y10T 29/49966; Y10T 29/49968; E21B 17/042; E21B 17/00; F16L 15/06; F16L 9/04; F16L 15/001; B21C 37/0811; B23K 15/0053
USPC .............. 29/402.02, 402.04, 402.05, 402.06, 29/402.07, 402.09, 402.11, 402.13, 29/402.16, 525.13, 525.14
See application file for complete search history.

(56) References Cited

U.S. PATENT DOCUMENTS

| | | | | | |
|---|---|---|---|---|---|
| 3,070,053 | A | * | 12/1962 | Woolley | B23K 37/08 228/13 |
| 3,331,286 | A | * | 7/1967 | Berquist | B23D 79/023 409/299 |
| 3,437,787 | A | * | 4/1969 | Chyle | B23K 9/164 219/137 R |
| 4,055,881 | A | * | 11/1977 | La Bate | B23K 9/04 29/402.13 |
| 4,404,721 | A | * | 9/1983 | Ohyama | B23B 5/165 29/240 |
| 4,964,305 | A | * | 10/1990 | Raulins | G01L 5/24 116/212 |
| 5,277,228 | A | | 1/1994 | Yamanashi | |
| 5,462,315 | A | * | 10/1995 | Klementich | E21B 17/0423 285/24 |
| 6,216,511 | B1 | * | 4/2001 | Ohnishi | B21C 37/0811 72/113 |
| 6,782,921 | B1 | | 8/2004 | Tsuru et al. | |
| 6,863,313 | B1 | * | 3/2005 | DeLange | E21B 17/042 285/329 |
| 7,635,006 | B2 | * | 12/2009 | Edstrom | F16L 55/1645 138/97 |
| 10,094,506 | B2 | * | 10/2018 | Kartanson | F16L 55/162 |
| 2001/0001219 | A1 | * | 5/2001 | Dawson | F16L 15/001 285/334 |
| 2004/0099644 | A1 | * | 5/2004 | Allen | B21C 37/0811 219/121.64 |
| 2005/0166987 | A1 | * | 8/2005 | Matsubara | B21C 37/154 138/142 |
| 2009/0155623 | A1 | * | 6/2009 | Ayer | B23K 5/006 428/680 |
| 2010/0038076 | A1 | * | 2/2010 | Spray | E21B 43/103 166/207 |
| 2010/0078118 | A1 | * | 4/2010 | Ehsani | B32B 1/00 156/94 |
| 2011/0010907 | A1 | * | 1/2011 | Bennett | F16L 55/163 29/402.09 |
| 2011/0023990 | A1 | * | 2/2011 | Yano | B21C 37/0811 138/156 |
| 2011/0203694 | A1 | * | 8/2011 | Brooks | F16L 55/1683 138/99 |
| 2011/0248071 | A1 | * | 10/2011 | Kiuchi | B23K 9/04 228/119 |
| 2013/0232749 | A1 | * | 9/2013 | Bruck | B23K 9/042 29/402.01 |
| 2014/0183862 | A1 | * | 7/2014 | Angelle | F16L 15/001 285/355 |
| 2015/0048059 | A1 | * | 2/2015 | Kurosawa | B23K 26/082 219/76.14 |
| 2015/0362115 | A1 | * | 12/2015 | Arnold | F16L 55/1645 138/98 |
| 2016/0033059 | A1 | * | 2/2016 | Fonte | C22F 1/183 138/171 |
| 2016/0195203 | A1 | * | 7/2016 | McElligott | E21B 17/042 285/390 |
| 2016/0207133 | A1 | * | 7/2016 | Kang | B21C 37/08 |
| 2017/0023167 | A1 | * | 1/2017 | Kartanson | F16L 55/162 |

OTHER PUBLICATIONS

International Patent Application No. PCT/US2018/015922 International Search Report and Written Opinion dated May 28, 2018 (15 pages).

* cited by examiner

ENHANCED WELDED PIPE, THREADED CONNECTIONS, AND METHODS FOR ACHIEVING THE SAME

CROSS-REFERENCE TO RELATED APPLICATIONS

This application claims benefit of U.S. provisional patent application Ser. No. 62/452,103 filed Jan. 30, 2017, and entitled "Enhanced Welded Pipe, Threaded Connections, and Methods for Achieving the Same," which is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure relates generally to tubular members, threaded connections therefor, and methods of manufacturing such products. Still more particularly, this disclosure relates to strengthening formed pipe that is fabricated into tubulars and joined by threaded connections, such as tubulars used in the recovery of oil and gas, including drill pipe, casing, risers, and tubing).

Background to the Disclosure

Threaded tubulars are common in many industrial applications, such as, for example, oil and gas drilling, production, transportation, refining, etc. In oil and gas drilling operations, a drill bit is threadably attached at one end of a threaded tubular and the tubular is rotated (e.g., from the surface, downhole by a mud motor, etc.) in order to form a borehole. As the bit advances within the formation, additional tubulars are threadably attached at the surface, thereby forming a drill string which, in turn, extends the length of the borehole. Once the borehole reaches a desired length, other threaded tubulars (i.e. threaded pipe) are joined end-to-end and set within the borehole as casing to isolate earthen zones and to provide a flow path for producing hydrocarbons, for example.

Some threaded tubulars are made from a plate of material (e.g. steel) that is formed into the tubular shape and welded longitudinally. In this process, the two longitudinal portions that are adjacent to the two outer edges of the plate are the last to be gripped and formed, and typically remain somewhat flat and do not achieve the desired inner and outer radius of the pipe. These lengthwise, flat portions on a welded pipe extend a distance of, for example, 1 to 2 inches in the circumferential direction from each side of the seam weld. These flat portions give the pipe a non-uniform inside diameter (ID) and can weaken the pipe, particularly at its threaded ends, i.e. at its pin end connector or its box end connector. As a result, a threaded connection formed by two coupled pipes (tubulars) may leak under certain conditions, being incapable of achieving a completely gas-tight or liquid-tight connection. It is often a requirement to achieve a gas-tight or liquid-tight connection when making-up a threaded connection between two tubulars joined end-to-end, and so improvements and alternate configurations that reliably provide a gas-tight or liquid-tight threaded connection for a tubular member are desirable.

In some applications where threaded pipe is used, it is desirable to run pipe that has a connector outside diameter (OD) that is as close to flush with the OD of the pipe as possible and that also has a connector inside diameter ID that is as close to flush with the ID of the pipe as possible so that the end connectors are integral and semi-flush. When coupling two pieces of welded pipe, each having integral, semi-flush end connectors, the resulting joint strength is quite limited, typically ranging between 40% and 50% of the base material strength. Often an acceptable semi-flush pipe-to-pipe joint can be achieved by adding weld-on connectors at the ends of each welded pipe instead of forming threads integral to the original pipe itself. As another option, seamless pipe can be used. With seamless pipe, which has a uniform ID and wall thickness, it is possible to swage the ends of the pipe before threading. Swaging increases the critical cross section of the threaded connectors that are machined directly into the wall of the pipe. At one end of the pipe, the first connector can be swaged (expanded) outward, and the other end of the pipe, the second connector can be swaged (compressed) inward, effectively increasing the amount of material available for machining the end connectors. Some semi-flush, swaged end connectors that are integrally formed on the seamless pipe can achieve tensile ratings of up to 75% or even 85% of the pipe material strength. In many instances, this increase in tensile efficiency is enough to make the threaded seamless pipe strong enough to meet the requirements of the application.

Unfortunately, welded pipe cannot be reliably and effectively swaged in the manner described. Frequently, the process of expanding or compressing the ends of welded pipe causes the pipe to split along the long seam weld or at least yield the material in the weld area beyond acceptable limits. A more reliable method for increasing the strength of integral, semi-flush end connectors, i.e. pin ends and box ends, on welded pipe is needed, particularly in the oil industry.

BRIEF SUMMARY OF THE DISCLOSURE

These and other needs in the art are addressed in one embodiment by a method for modifying a tubular member having a tube end, an exterior surface, an interior surface, a nominal wall thickness, a central axis, and a welded seam, wherein the welded seam forms a portion of the interior surface. The method includes: applying a patch of material to the interior surface, such that the patch covers an arcuate segment of the interior surface that includes the welded seam and that extends from the tube end to an axially spaced first location; and machining the patch such that the interior surface of the tubular member from the tube end to the axially spaced first location has a uniform inside diameter. In some embodiments, the patch is machined such that, in an axial cross section of the tubular member, the wall thickness is uniform around the circumference of the tubular member. The material may be a patch of weld material; wherein applying the patch comprises welding a first layer of weld material to the interior surface, and welding a second layer of weld material to the first layer. In some embodiments, before machining the patch, the first layer has a thickness T1 and the second layer has a thickness T2; and wherein machining the patch removes all of T2 and a portion of T1. In some embodiments, applying the patch comprises welding the patch using a heat input not greater than 50 kilo-Joules per inch of weld length, and in some embodiments, welding the first layer is performed at a first heat input; and welding the second layer is performed at a second heat input that differs from the first heat input. In some embodiments, applying the patch is performed using a material that has a yield strength that is equal to or exceeds the yield strength of the tubular member. In some embodiments, the yield strength of the material of the patch exceeds the yield strength of the tubular member by at least 6%. In some embodiments, the method includes blanking-in the exterior surface by machining the tubular member to taper from a minimum wall thickness adjacent the tube end to a greater thickness at a second location that is axially spaced from the tube end and, in some embodiments, the method includes machining threads on the exterior surface after blanking-in the exterior surface; wherein the threads include a root surface, and the uniform wall thickness extends radially at least from interior surface to the root surface. In some embodiments, the method includes securing the tubular member in a machine and, before removing the tubular member from the machine, machining the patch, blanking-in the exterior surface, and machining the threads on the exterior surface and, in some embodiments, the method also includes blanking-in the interior surface by machining the tubular member to taper from a minimum wall thickness adjacent the tube end to a greater thickness at a second location that is axially spaced from the tube end, and machining threads on the interior surface after blanking-in the interior surface. In some embodiments, applying a first layer of weld material comprises applying a plurality of weld passes, each of the weld passes contacting another of the weld passes that is adjacent. Each of the weld passes may extend circumferentially and contact another of the weld passes that is axially adjacent. In some embodiments, the method further comprises: engaging threadingly the pin end of a first tubular member and a box end of a second tubular member; wherein, engaging threadingly includes forming a circumferentially extending interference fit between a non-threaded portion of the pin end and a non-threaded portion of the box end, the non-threaded portion of the pin end including a portion of the patch. The outside diameter of the box end may be the same as the outside diameter of the first tubular member, and the outside diameter of the box end of the second tubular member may be greater than the outside diameter of the first tubular member. In some embodiments, the box end comprises a forging that is welded to a non-threaded end of the second tubular member. In some embodiments, the method also includes swaging the tubular member adjacent the tube end, resulting in the tube end being expanded in diameter, and in some embodiments the method includes swaging the tubular member adjacent the tube end, resulting in the tube end being contracted in diameter Also disclosed is a tubular member that includes a tube body, a tube end, an exterior surface, an interior surface, a nominal wall thickness, a longitudinal axis, a welded seam, and a patch of material. The welded seam forms an arcuate portion of the interior surface, and the patch covers a portion of the interior surface that includes a portion of the welded seam. The patch extends from the tube end to an axially spaced first location. The resulting interior surface from the tube end to the axially spaced first location has a uniform inside diameter. In some embodiments, the exterior surface of the tubular member includes threads adjacent the tube end, and in some embodiments, the exterior surface is tapered relative to the axis, and the threads are tapered wedge threads. The exterior surface may also include a non-threaded seal surface disposed between the tube end and the threads; wherein the patch is axially aligned with the seal surface and at least a portion of the threads. In some embodiments, the patch extends beyond the seal surface and extends at least 2 inches and at most 18 inches from the tubing end. In some embodiments, the patch is contained within an arc length of 45 degrees or less. In some embodiments, the welded seam has two longitudinally extending sides, and the patch extends circumferentially beyond each side of the welded seam by a distance of at least 1.5% and less than 5% of the circumference of the tubular member. In some embodiment, a portion of the inner surface has a non-uniform inside diameter, and this non-uniform portion is adjacent the welded seam and is axially spaced from the first tube end and is disposed beyond the first location. The yield strength of the material of the patch exceeds the yield strength of the tubular member by at least 6% in some embodiments. The yield strength of the material of the patch may be substantially equal to the yield strength of the tubular member. In some embodiments, the welded seam extends as a spiral along the length of the tubular member from the tube end to an opposite end of the tubular member. In some embodiments, the exterior surface is cylindrical relative to the axis, and the threads are cylindrical wedge threads.

Also disclosed is a tubular member including a tube end, an exterior surface, an interior surface, a nominal wall thickness, a longitudinal axis, a welded seam, a patch of weld material, and a weld enhancement end location axially spaced from the tube end. The welded seam forms an arcuate portion of the interior surface. The patch covers a portion of the interior surface that includes a portion of the welded seam and extends axially from the weld enhancement end location toward the tube end. The portion of the interior surface covered by the patch has a uniform inside diameter. In some embodiments, the exterior surface includes threads adjacent the tube end and extending axially along a portion of the patch. In some embodiments, the interior surface includes threads adjacent the tube end; wherein the weld enhancement end location is axially spaced apart from the threads; and wherein the patch extends axially from the weld enhancement end location to a second location adjacent the threads. In some embodiments, the modulus of elasticity of the material of the patch is within 20% of the modulus of elasticity of the tube body.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings, wherein.

NOTATION AND NOMENCLATURE

Figure 1:
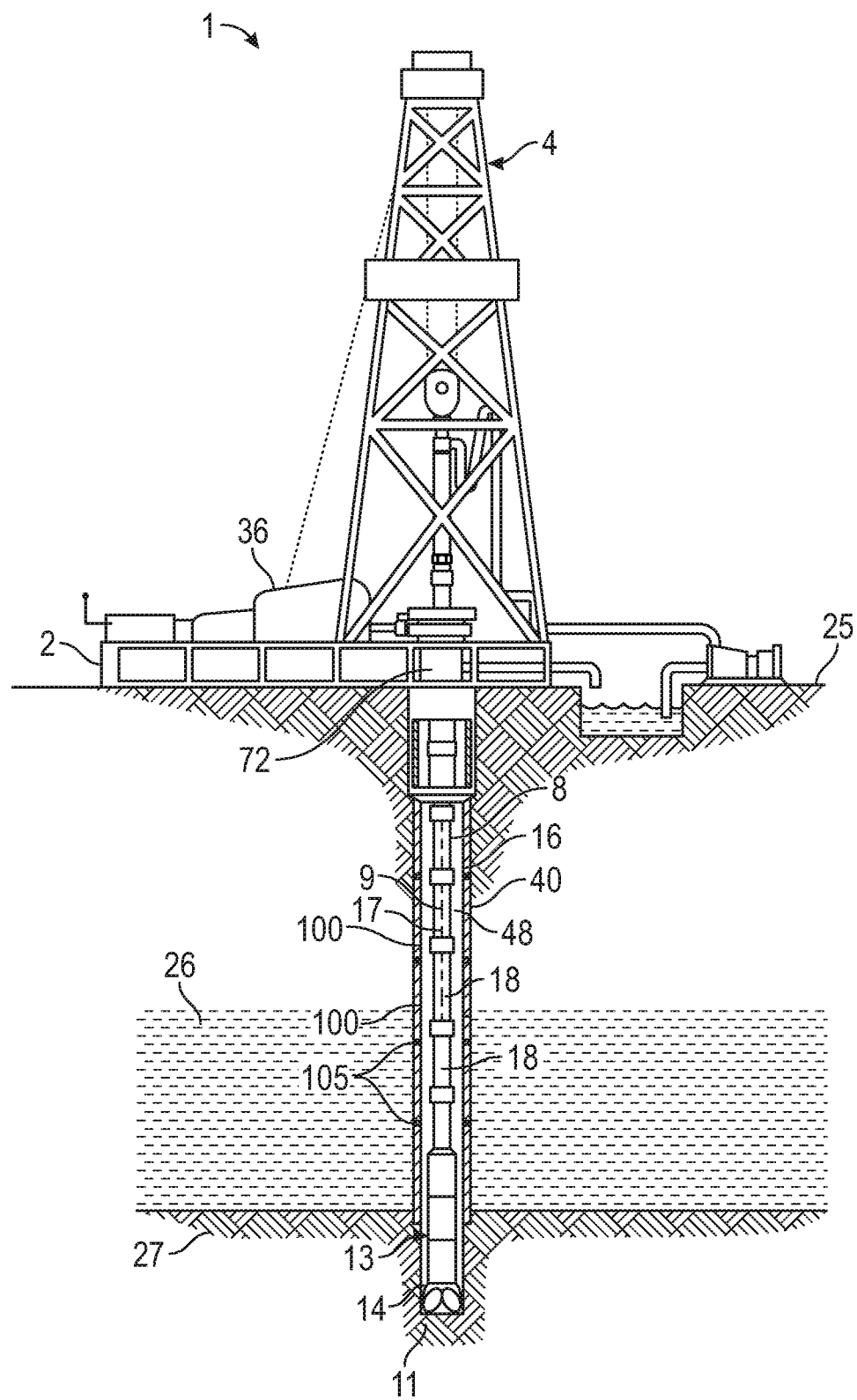
FIG. 1 is a schematic elevation view of an embodiment of a system having enhanced welded pipes in accordance with principles disclosed herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and any number of other factors. The word "or" is used in an inclusive manner. For example, "A or B" means any of the following: "A" alone, "B" alone, or both "A" and "B." In addition, as used herein including the claims, the word "substantially" means within a range of plus or minus 10%. As used herein including the claims, the word "uniform" is equivalent to the phrase "uniform or substantially uniform."

In regard to a borehole, "up," "upper," "upwardly" or "upstream" means toward the surface of the borehole and "down," "lower," "downwardly," or "downstream" means toward the terminal end of the borehole, regardless of the borehole orientation.

DETAILED DESCRIPTION OF THE DISCLOSED EXEMPLARY EMBODIMENTS

A welded tubular member (also referred to herein simply as a "pipe" or a "tubular") and a method of making the tubular are disclosed as including the addition of extra material in the last several inches of length at the end of a longitudinal weld that forms the tubular, the result being an enhanced welded tubular member. The additional material, which may also be described as a "patch of material", is carefully chosen and applied in a manner to cause the additional material to approximate closely the metallurgical properties of the base material of the tubular or to approximate closely the metallurgical properties of the longitudinal weld. In some embodiments, the tubular member is formed from metal, and in some embodiments, the additional material applied to the tubular member is a metal. The additional material is applied in enough length, width and height to allow it to be machined flush with the surrounding material of the tubular member, resulting in a tubular end having a uniform inside diameter and—at any selected axial location—a uniform wall thickness, and, preferably, uniform metallurgy. Formed (for example, machined) in this manner, the tubular end may be additionally configured to include a high pressure, gas tight, metal-to-metal sealing surface capable of absorbing the significant compressive forces required for gas tight sealing up to the strength limits of the tubular member while retaining uniform elasticity around the full circumference of the sealing surface. Furthermore, tubular ends, e.g. pipe ends, formed in this manner would also facilitate swaging to accommodate semi-flush connector designs that would possess greater loading capacities than similar connectors formed on a non-swaged tubular end. Threads may be added to the tubular end having the additional material. In some embodiments, an enhanced welded tubular member formed in accordance with principles disclosed herein achieves a mechanical property or performance characteristic similar to, equal to, or greater than the mechanical property or performance characteristic of a similarly sized seamless tubular member.

FIG. 1 is a schematic diagram showing an embodiment of a well system in accordance with principles described herein. Well system 1 includes a tubular string 8 (e.g., drill string, production tubing string, coiled tubing, etc.) to accomplish downhole operations. In the example shown, tubular string 8 is a drill string, and well system 1 is a drilling system that includes a derrick 4 supported by a drilling platform 2. Although FIG. 1 shows a land-based drilling system, the present disclosure is also applicable to off-shore well drilling systems.

The drill string 8 extends downward and comprises a longitudinal axis 9 and various components, including one or more tubular members 18 (i.e. pieces of drill pipe, which may also be called a pipe joint) coupled together end-to-end and extending along axis 9, a bottom-hole-assembly (BHA) 13 coupled to the lowest tubular member 18, and a drill bit 14 coupled to the lower end of BHA 13. The drill bit 14 is coupled to and forms the distal end of the drill string 8. With weight applied to the drill string or bit, bit 14 is rotated by known means and the bit disintegrates subsurface formations to drill the borehole 16, which may also be called a well bore. Borehole 16 comprises a generalized centerline or longitudinal axis 17 and may pass through multiple subsurface formations or zones 26, 27 and may transition between vertical and horizontal portions. The drill string axis 9 may be generally aligned with borehole axis 17, at least in various places or during some time periods of operation.

Referring still to FIG. 1, as drilling progresses, the borehole 16 penetrates a subsurface formation, zone, or reservoir, such as reservoir 11 in subsurface formation 27 that is believed to contain recoverable hydrocarbons. A tubular casing 40 is installed and extends downward from the earth's surface 25 and into at least a portion of borehole 16 along axis 17. Typically, casing 40 is cemented to borehole 16 to isolate various vertically-separated earthen zones, such as zones 26, 27, preventing fluid transfer between the zones. Casing 40 comprises multiple tubular members, such as pieces of threaded pipe 100, joined end-to end at threaded connections 105 that are liquid-tight or gas-tight, to prevent a fluid from a surrounding earthen zone from entering the casing. An annular space or annulus 48 is formed between the sidewall of borehole 16 and drill string 8 and between casing 40 and drill string 8.

Figure 2:
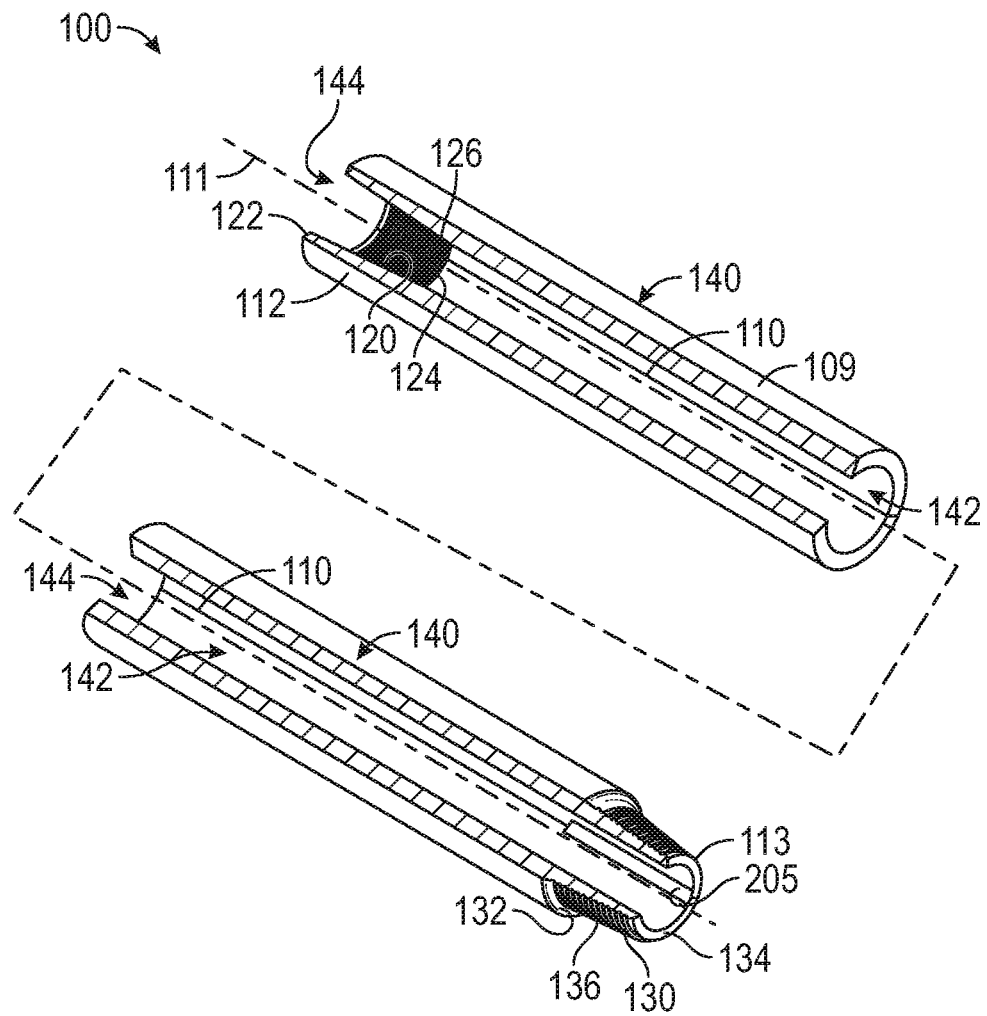
FIG. 2 is a perspective cross-sectional view of one of the enhanced welded pipes of the system of FIG. 1.

Referring now to FIG. 2, the welded tubular member or pipe 100 (as may be employed, for example, as a portion of casing, in a drill string, or in a riser in offshore applications) includes a tubular body 109 extending along a central or longitudinal axis 111, a first or upper end 112, a second or lower end 113 opposite upper end 112, a radially exterior surface 140 extending axially between ends 112, 113, and a radially interior surface 142 defining a throughbore 144 that also extends axially between pipe ends 112, 113. Pipe 100 is formed first by rolling a sheet of material, such a steel plate for example, and joining two sides of the sheet together by forming a longitudinally, i.e. an axially, extending welded seam 110. In FIG. 1, pipe 100 is disposed such that axis 111 is generally aligned with axis 17 of wellbore 16.

Referring again to FIG. 2, longitudinal seam 110, which may also be simply called a weld 110, extends radially between surfaces 140, 142 and may extend or bulge beyond one or both surfaces 140, 142, during at least some stage of the manufacturing process. A weld enhancement 205, which may also be called a patch 205, is added as an arcuate segment across a portion of the tubular member, including a portion of the seam 110, along the interior surface 142 at end 113. Weld enhancement 205 strengthens the pin 130, compensating for weakness that results from imperfections in the roundness of pipe 100 or imperfections in the longitudinal seam 110, as examples. After completion, the interior surface of weld enhancement 205 is flush with the remainder of interior surface 142. Weld enhancement 205 is added to the interior surface along the longitudinal weld of a tubular, for example at a pin end of a pipe, reduces geometric non-uniformities that act as stress risers and weaken the welded seam 110. Adding weld enhancement 205 configures and strengthens the tubular and its seam 110 to resist compressive stress, such as a compressive hoop stress in the pin end that results from threadingly coupling a pin end into a box end, particularly when the coupling includes an interference fit. Connector types benefitting from weld enhancement 205 would include those utilizing wedge threads, straight threads, tapered threads, multi-step threads, and those with sealing surfaces that are not threaded, as examples. Adding weld enhancement 205 also configures and strengthens the tubular and its seam 110 to resist tensile and compressive stresses associated with swaging. Weld enhancement 200, methods of forming it on pipe 100, and its benefits will be described in greater detail later in this disclosure.

A threaded connector is disposed at each end 112, 113 of pipe 100 to facilitate the making of threaded connections to form casing 40 as previously described. In particular, a threaded female or box end connector 120 (or more simply "box end 120" or "box 120") is disposed at upper end 112 and extends axially from upper end 112 toward lower end 113. Also, a threaded male or pin connector 130 (or more simply "pin end 130" or "pin 130") is disposed at lower end 113 and extends axially from lower end 113 toward upper end 112. As will be described in more detail below, box 120 includes internal threads that are configured to mate threadably and connect with the threads of a pin 130 of another, axially aligned pipe 100 (e.g., aligned with respect to axis 111) and pin 130 includes external threads that are configured to threadably mate and connect with the threads of a box threaded connector (e.g., box 120) of another, axially aligned pipe 100 (e.g., aligned with respect to axis 111). Further details of box 120 and pin 130 will be described in more detail below. As is known in the art, the plural term "threads" broadly refer to a single, helical thread path, to multiple, parallel helical thread paths, or to portions of one or more thread paths, such as multiple troughs or trough portions axially spaced-apart by crests.

Threaded pin end connector 130 includes a first or external annular shoulder 132 that extends radially inward from radially exterior surface 140 and a second or internal annular shoulder 134 that extends radially outward from radially interior surface 142 at lower end 113. Thus, shoulders 132, 134 are axially spaced from one another along axis 111. External shoulder 132 may also be referred to herein as a "pin shoulder" 132 and internal shoulder 134 may be referred to herein as a "pin nose" 134. Shoulders 132, 134 are configured to engage with corresponding shoulders in a box threaded connector (e.g., shoulders 122, 124, respectively on box 120) on a mating pipe 100. External threads 136 are formed along pin 130 in a region extending axially between shoulders 132, 134. External threads 136 on pin 130 are formed along a line of taper that is angled relative to axis 111, i.e. not parallel to axis 111, at least in this example. Thus, threads 136 on pin 130 are tapered threads, tapering relative to axis 111. Although these threads are shown as being formed along a line of taper, it is not necessary that the threads be tapered; the threads could be non-tapered or cylindrical (straight). This weld enhancement is suitable for threaded connectors having various thread types, including various straight threads and various tapered threads.

Continuing to reference FIG. 2, box threaded connector 120 includes a first or external annular shoulder 122 that extends radially inward from radially exterior surface 140 at upper end 112 and a second or internal shoulder 124 that extends radially outward from radially inward from radially interior surface 142. Thus, shoulders 122, 124 are axially spaced from one another along axis 111. External shoulder 122 may also be referred to herein as a "box nose" 122 and internal shoulder 124 may also be referred to herein as a "box shoulder" 124. Shoulders 122, 124 of box 120 are configured to engage with a corresponding shoulder 132, 134 in a pin threaded connector on a mating piece of pipe 100.

Internal threads 126 are formed along box 120 in a region extending axially between shoulders 122, 124. Internal threads 126 on box 120 are formed along a line of taper that is angled relative to axis 111, as was previously described of external threads 126 of pin 130. Thus, threads 126 on box 120 are tapered threads, tapering relative to axis 111. Although these threads are shown as being formed along a line of taper, it is not necessary that the threads be tapered; the threads could be non-tapered or cylindrical (straight). The weld enhancements disclosed in this document apply equally well to both straight and tapered threaded connectors.

Figure 3:
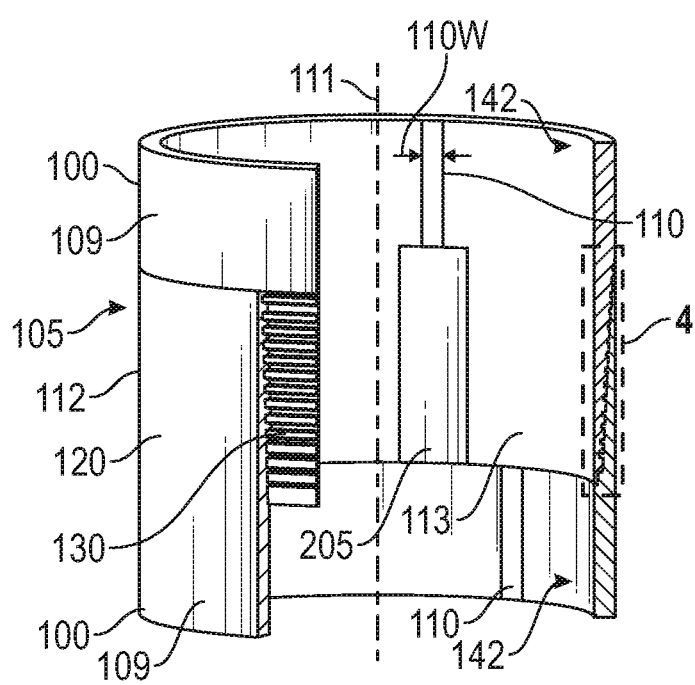
FIG. 3 is a closer perspective cross-sectional view of the enhanced welded pipe of FIG. 2 threadingly coupled or joined with a second, similar pipe, only a fraction of the length of each tubular member is shown.

FIG. 3 shows a closer view of a threaded connection 105 formed by two pieces of threaded pipe 100 joined end-to end by threads 126, 136. For one piece of pipe 100 (the upper pipe of FIG. 3), only the lower end 113 is shown; its pin 130 is threadingly received within the box 120 of the upper end 112 of another piece of pipe 100 (lower portion of FIG. 3). Each pipe 100 is formed from a rolled plate of material joined by axially extending seam 110, as previously described and extending circumferentially a width designated by the reference numeral 110W on the inside of pipe 110. Weld enhancement 205 is formed on the seam 110 of pin 130 of the upper pipe 100, and thus, welded pipe 100 and pin 130 on pipe 100 may be described as being "enhanced" or "weld-enhanced." In various embodiments, a weld enhancement 205 is also formed on the seam 110 at the pin end of the lower pipe 100, which may participate in another threaded connection with a third pipe or other object. Connection 105 is referred to as a flush connection because the outside diameters of both pipes 100 are the same and inside diameters of both pipes 100 are the same at the mating ends 112, 113, causing the outer surfaces 140 to be flush and the inner surfaces 142 to be flush. Other connection types are possible while still complying with the principles disclosed herein. For example, in some embodiments, an enlarged box end, i.e. a box end having a larger outside diameter than the remainder of its pipe 100, may be used along with the weld-enhanced pin 130 of FIG. 2 and FIG. 3. In some embodiments, a box end is welded circumferentially to a pipe prior to being threaded on to the enhanced pin 130. The welded box end may be, for example, a forging. In some embodiments, a box end is formed on a pipe that does not include a longitudinal weld, and is then joined with the enhanced pin 130. In other embodiments, box ends are formed on both ends of a shorter pipe without weld enhancement and are threadingly coupled to enhanced pin ends formed on two separate pipes. Also, in some embodiments, a compressed (inwardly swaged) pin end may be used along with box member 140 on FIG. 4. When added to pipe 100, an inwardly swaged pin end has a smaller inside diameter than the remainder of pipe 100.

Figure 4:
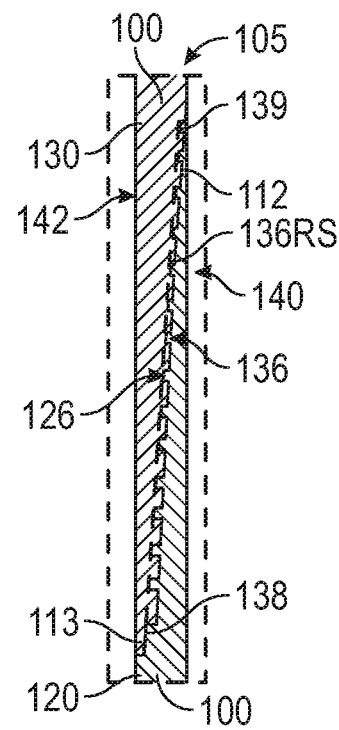
FIG. 4 is a closer cross-sectional view of the threaded connection of FIG. 3.

FIG. 4 shows a close-up view of an axially extending cross-section of the mating threads of box 120 and pin 130 of FIG. 3, having threads 126, 136, respectively, coupled together. The threads 126, 136 in this example are tapered wedge threads, having a thread form with a dovetail wedge shaped cross-section that is narrow near pipe end 113 and gradually becomes wider in the axial direction as the helical thread path extends away from end 113. Various other embodiments have another type of thread, for example a tapered thread having a thread form with a uniform cross-section. To be referenced later, the tapering root surface 136RS of pin threads 136 is generally indicated in FIG. 4 and generally corresponds to the crests of mating threads 126.

When coupled as shown in FIG. 4, a region that includes interior seal interface 138 is formed between the end 113 of upper pipe 110 and a mating interior surface region on lower pipe 100. At interface 138, the outer diameter of upper pipe 110 is slightly larger than the inside diameter of lower pipe 100, causing the mating surfaces to interfere with each other. That is to say the mating surfaces of the two pipes at interface 138 rub against each other as they are rotated into position, creating an interference fit at interface 138, and configuring interface 138 to seal, inhibiting or resisting the passage of fluid, including a gas such as natural gas, for example. The interference fit at interface 138 adds compressive hoop stress to the pin 130, particularly to the inner surface of pin 130 at end 113. Similarly, in at least some embodiments, a region that includes an exterior seal interface 139 is formed between the end 112 of lower pipe 110 and a mating surface region on upper pipe 100. At interface 139, the outer diameter of upper pipe 110 is slightly larger than the inside diameter of lower pipe 100, creating an interference fit at interface 139, and configuring interface 139 to seal, inhibiting or resisting the passage of fluid.

Figure 5:
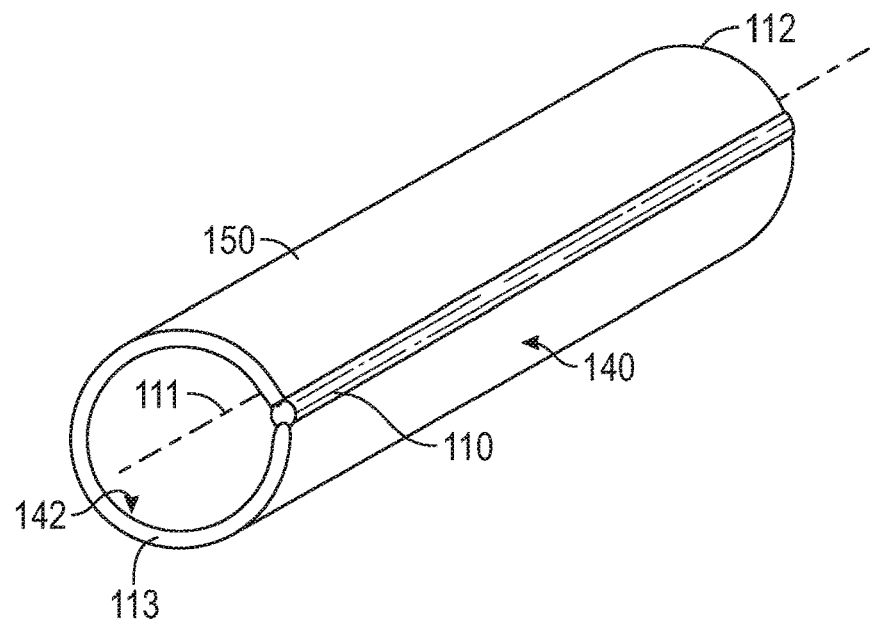
FIG. 5 (prior art) is a perspective view of a welded tubular member that may be used as a starting point to form the tubular member of FIG. 2.

Referring now to FIG. 5, a method for modifying a tubular member to form an enhanced welded pipe 100 will be described. In some embodiments, the method starts with a standard tubular member, which in this example is a piece of rolled, welded pipe 150 having a central or longitudinal axis 111, a first end 112, a second end 113, an exterior surface 140, an interior surface 142, and an axially extending welded seam 110. Pipe 150 has a nominal wall thickness extending between surfaces 140, 142. In this example, the seam 110 extends or bulges radially outward beyond the remainder of exterior surface 140 and radially inward beyond the remainder of interior surface 142. In an example, pipe 150 is API 5L OCTG welded pipe.

Figure 6:
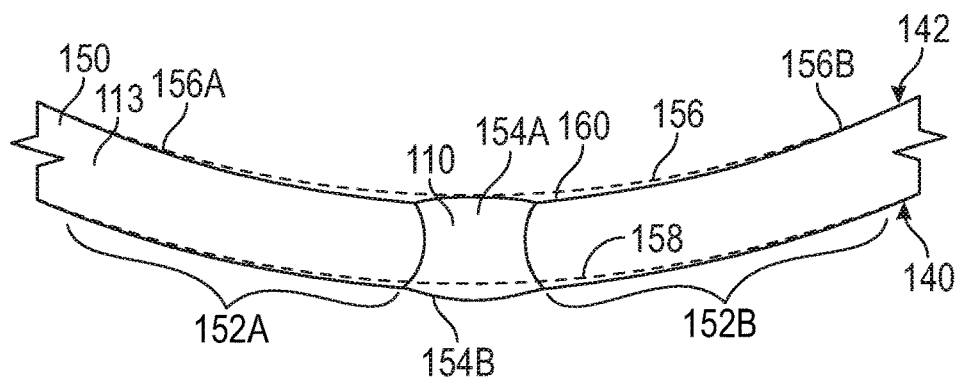
FIG. 6 (prior art) is a partial end view of the tubular member of FIG. 5.

FIG. 6 shows the second end 113 of standard welded pipe 150. Seam 110, which extends between the two ends 113, 112, includes a convex inward bulge 154A and a convex outward bulge 154B. Seam 110 couples a pipe wall first portion 152A and a pipe wall second portion 152B, which were formerly the side portions of the sheet of material that was formed into pipe 150. Portions 152A, B extend longitudinally, i.e. axially, between the pipe ends 112, 113. Due to the nature of the rolling process applied to form pipe 150, the portions 152A, B are substantially flat or are not fully curved as compared to the remainder of the circumference of pipe 150. The flatness or limited curvature of portions 152A, B is evident in comparison with an idealized inner circle 156 that follows the inner surface and inside diameter of the majority of pipe 150 and in comparison with an idealized outer circle 158 that follows the outer surface and outer diameter of the majority of pipe 150. On the left, portion 152A separates from inner circle 156 at a tangent point 156A, and on the right side, portion 152B separates from inner circle 156 at a tangent point 156B, as the portions 156A, B extend toward seam 110. Thus, an offset or gap 160 is located on between the idealized inner circle 156 and portions 156A, B. Gap 160 has a non-uniform thickness, as it extends in the circumferential direction. Portions 156A, B have an inner radius that varies and that is larger than the average radius of pipe 110 and larger than the radius of inner circle 156. In some embodiments, the relatively flat, welded portions 152A, B extend between 1.5% and 5% of the nominal circumference of pipe 150. As an example, for some 20 inch diameter pipes or tubulars, the portions 152A, B extend between 1 and 3 inches from seam 110 in a circumferential direction. In some of these embodiments, portions 152A, B extend 2 inches or 3% of the circumference of pipe 150. Pipe 150 is an example of a tubular member that can be modified in accordance with principles described herein to form an enhanced welded pipe 100.

Figure 7:
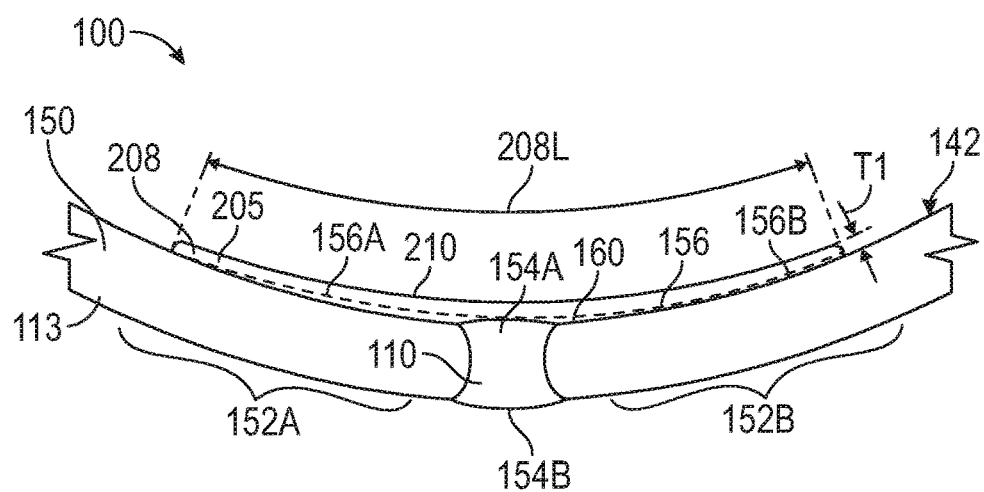
FIG. 7 is a partial end view of the enhanced welded pipe of FIG. 2, showing an enhancement weld layer added across the longitudinal welded seam in accordance with principles disclosed herein.

Referring now to FIG. 7, the enhanced welded pipe 100 is shown from the view point of the second end 113, prior to adding any threads to form pin 130. Visible in FIG. 7 are: the first portion 152A welded to the second portion 152B at longitudinal welded seam 110 forming pipe 150, the convex inward bulge 154A, the convex outward bulge 154B, and weld enhancement 205, which is applied as a single weld pass 208 applied forming an enhancement weld layer 210 of weld material on the original interior surface 142 to redefine that interior surface and potentially to refine it. Typically, weld pass 208 is centered on seam 110 and has a length 208L such that weld pass 208 extends up to or beyond the tangent point 156A of ID circle 156 in a first direction and extends up to or beyond the other tangent point 156B in the opposite direction. Thus, weld pass 208 covers the circumferential extent of welded portions 152A, B of the base member, which is pipe 150, and, likewise, cover the circumferential extent of gap 160, and extends beyond these features in at least some embodiments. Weld pass 208 is arcuate in form. Weld pass 208 and the layer 210 that it forms extend radially inward by a distance or thickness of T1, filling some or all of the radial extent of gap 160 shown in FIG. 6, or extending radially inward beyond the ID circle 156 and gap 160.

Figure 8:
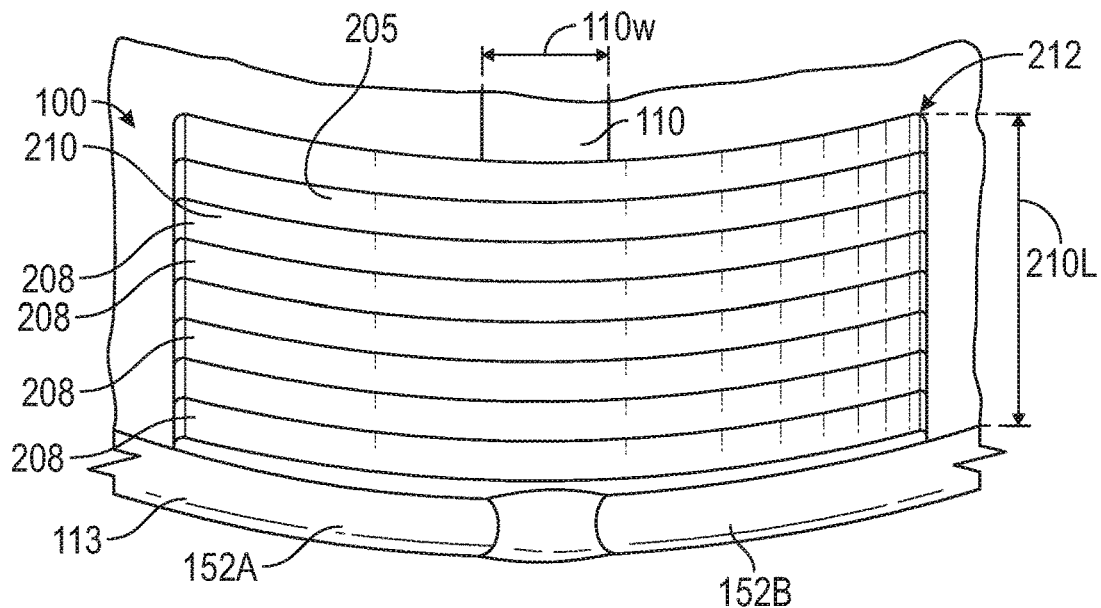
FIG. 8 is a perspective view of the enhanced welded pipe of FIG. 7, showing multiple, axially spaced weld passes of the enhancement weld layer.

In the perspective end-view of FIG. 8, the layer 210 of weld enhancement 205 has been extended axially to an end location 212 by the application of multiple operational passes that are configured to lay-down the material of weld enhancement 205. In this example, the operational passes are weld passes 208, each adjacent and touching the previous. In this example, eight weld passes 208 have been applied in the circumferential direction, spanning beyond both sides of the axial welded seam 110. Layer 210 has an arcuate width equal to the length 208L of the weld passes 208 and has an axial length 210L that extends from pipe end 113 to the weld enhancement end location 212, which is axially spaced from end 113. End location 212 is selected based on the amount of strength to be added to pipe 100, is based on the axial length of pin threads 136 that will be formed on pipe end 113, or is based on one or more other factors such as the axial length of the connector being machined on the pipe (which may include pin threads 136 plus a non-threaded portion) or the axial length of a swage that might be applied, as examples. In various embodiments, axial length 210L is between 1 and 16 inches.

Figure 9:
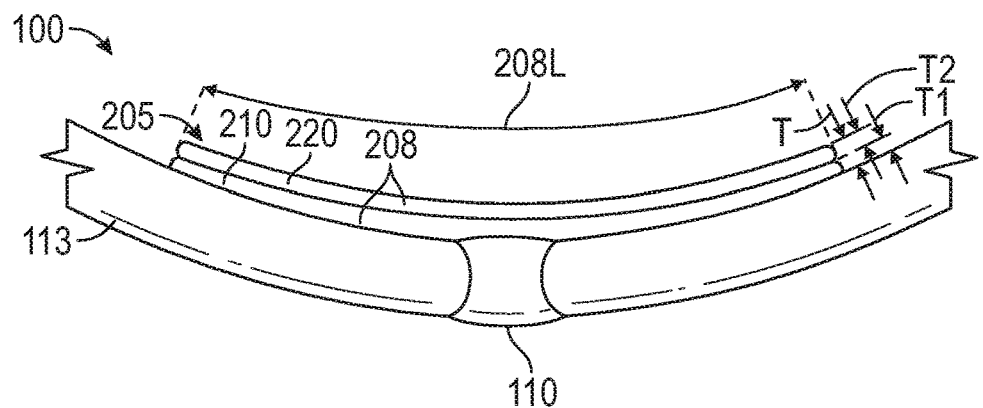
FIG. 9 is a partial end view of the enhanced welded pipe of FIG. 2, showing two enhancement weld layers added across the longitudinal welded seam in accordance with principles disclosed herein.

Referring now to FIG. 9, a second layer 220 of weld passes 208 is added on the top, i.e. the radially-inner surface, of the first layer 210. Enhancement weld layer 220 includes the same number of passes 208 as does layer 210, and extends axially to a length of 210L ending at location 212, which are shown in FIG. 8. Referring still to FIG. 9, second layer 220 has an arcuate width equal to layer 210 and equal to the length 208L of the weld passes 208. Although, in some other embodiments, second layer 210 may include more or fewer weld passes 208 as compared to first layer 210, and may have a different arc length or different axial length than layer 210. Layer 210 extends radially inward by a distance or thickness T2. Consequently, in FIG. 9, the patch or weld enhancement 205 has a total thickness "T" equal to T1 plus T2 after the two layers of weld passes are completed. Thickness T2 is equal to or substantially equal to thickness T1, and in some embodiments, T2 may be more or less than T1. In other embodiments, weld layer 210 may consist of weld passes 208 laid in an axial direction rather than in a circumferential direction. Likewise, weld passes 208 of layer 220 may be laid in an axial direction or a circumferential direction, even if the weld layer 210 consists of weld passes 208 laid in an axial direction or a circumferential direction.

Weld passes 208 are produced with a welding machine set at a selected heat input. Heat input refers to the amount of electrical or thermal energy applied to the weld pass per unit length. For example, the heat input used to produce a weld pass 208 may be up to 90 kilo-Joules per inch (KJ/inch) of weld length. Higher rates of heat input might be effective for some weld enhancements. More preferably, the welding is performed at a heat input not greater than 50 KJ/inch of weld length. In various embodiments, the welding is performed at a heat input between 25-40 KJ/inch. Within this range, a heat input of 30 KJ/inch produces effective welds. In some embodiments, a heat input less than 25 KJ/inch is used. A constant heat input may be used throughout the formation of a weld enhancement 205 and its multiple passes 208 and one or multiple weld layers. Of course, operation conditions, such as conditions beyond an operator's control, may cause the actual heat input to vary to some degree; even so, the applied heat input is considered to be constant. Optionally, the heat input may be varied while producing a weld enhancement 205. The heat input may be different for the different layers 210, 220 of welds or for the different weld passes 208 of a given layer. As an example, the weld passes 208 of the first layer 210 are formed with a cool heat input of 20 KJ/in, and the weld passes of the second layer 210 are formed with a heat input that is 25 to 100% higher, that is to say a heat input in the range of 25 to 40 KJ/in. Other ranges of heat inputs are contemplated. In another example, the second layer 220 is formed with a lower heat input than the first layer 210. Welding enhancement 205 may be formed using any of several welding processes or techniques. As examples, Tungsten-Inert-Gas (TIG), Metal-Inert-Gas (MIG), flux core, submerged arc (SAW), or laser welding may be used. Temperature of the welding tool or welding zone may be a parameter that is selected and maintained in order to form the weld passes.

The weld layers 210, 220 at pin end 130 are homogeneous or substantially homogeneous, and the application of one or both weld layers 210, 220 alters, potentially refining, the metallurgical properties or granular structures of welded seam 110 at pin end 130, in at least some embodiments. The application of the second weld layer 220 alters, potentially refining, the metallurgical properties or granular structures of the first weld layer, in at least some embodiments.

The weld material selected for weld enhancement 205 is compatible for welding with the base material of the welded pipe 150 and the material of its welded seam 110, which form the majority of enhanced welded pipe 100. For metal tubulars, evaluation of material compatibility involves consideration of metallurgical properties. In at least some embodiments, the weld material that is used for the enhancement 205 has a strength property that exceeds a strength property of the welded pipe 150. For example, in some embodiments, the yield strength of the weld material exceeds the yield strength of the tubular member by 5% to 15%. In some embodiments, the yield strength of the weld material exceeds the yield strength of the tubular member by at least 6%. In one example, a weld material is selected having yield strength of 85 kpsi (thousands of pounds per square inch) for application to a tubular member 150 having yield strength of 80 kpsi. For at least some embodiments, the comparison of yield strengths is accomplished by using the yield strength of the base material, i.e. the stock material, of welded pipe 150, before the material is rolled and longitudinally welded and by using the yield strength of the stock weld material prior to using it to form weld enhancement 205. Yield strength and other material properties may be obtained by any means or any source known in the art, including manufacture data. For at least some embodiments, the comparison of yield strengths is accomplished using the yield strength of the welded pipe 150 after completing the fabrication of this tubular member which is later used to form the pipe 100. Material hardness may be used as a rough indicator of yield strength, and a punch test for material hardness may be used in some situations to compare the strength of the two materials.

Without being limited to a particular theory, the weld material for weld enhancement 205 is selected by comparison of yield strengths because the yield strength of the base material of the pipe 150 changes when it is rolled, and the yield strength of some portion changes again when welded. When rolled, the sheet of base material is cold-worked, increasing its yield strength. The surface that becomes exterior surface 140 is cold-worked in tension, and the surface that becomes interior surface 142 is cold-worked in compression, with a radial transition from tension to compression in the material between the rolled surfaces 140, 142. After rolling, during welding, some base material of pipe 150 near the weld 110 losses some of the additional yield strength it achieved during cold-working, the loss occurring due to the heat of welding. (This heating effect is sometimes described as "stress-relief.") The goal or the result of selecting a weld material for weld enhancement 205 having a strength greater than the base material of pipe 150 is to achieve a weld enhancement 205 having a strength that is equal to or greater than the resulting, increased strength of the majority of the rolled, welded pipe body 150, that is to say, the portion not affected by the heat of welding. It is presently believed that applying weld enhancement 205 compensates for the reduction of mechanical properties (e.g. loss of yield strength) that occurs near the fusion line between the weld 110 and the base material of pipe 150. Thus, weld enhancement 205 compensates for material weaknesses of pipe 150 that occur near weld 110. Weld enhancement 205 also compensates for geometric non-uniformities or weaknesses near weld 110, such as gap 160 on the inner surface of pipe 150 in FIG. 6.

After machining threads and when pin end 130 is threadingly coupled to box end 120, pin end 130 experiences compressive hoop stress. The material of the pin end 130, experiences compression due to the interference fit within box end 12.

In at least some embodiments, selecting a weld material for weld enhancement 205 by comparison of yield strengths in the manner previously described, results in an enhanced tubular member 100 with a yield strength that is substantially uniform throughout the pin end 140. However, in at least some of these embodiments, the resulting yield strength of enhanced tubular member 100 at pin end 140 is substantially uniform in the axial direction (along axis 111) and in the circumferential direction, but the resulting yield strength exhibits meaningful variation in the radial direction due to the rolling that was performed on base material of the pipe. In some embodiments, a strength property other than yield strength may be used in the comparison for selecting a weld material for weld enhancement 205.

It is presently believed that the tensile strength of pipe 100 is not altered by the rolling process to the same extent as is compressive strength; therefore, in the embodiment of FIG. 3, no weld enhancement was added to the box end 120 because it experiences tension and not compression when joined with pin end 130 to form threaded connection 105, including the seal interface 138 and seal interface 139. Another reason for not adding a weld enhancement to box end 120 is that its thickness is greater at seal interface 138 than is the thickness of pin end 130 at this same interface. Seal interface 138 is radially closer to the inner volume of pin end 130 and box end 120 than is seal interface 139 and, as such, interface 138 is a first line of defense against a fluid leaking from the pipe ends 130, 120.

Figure 10:
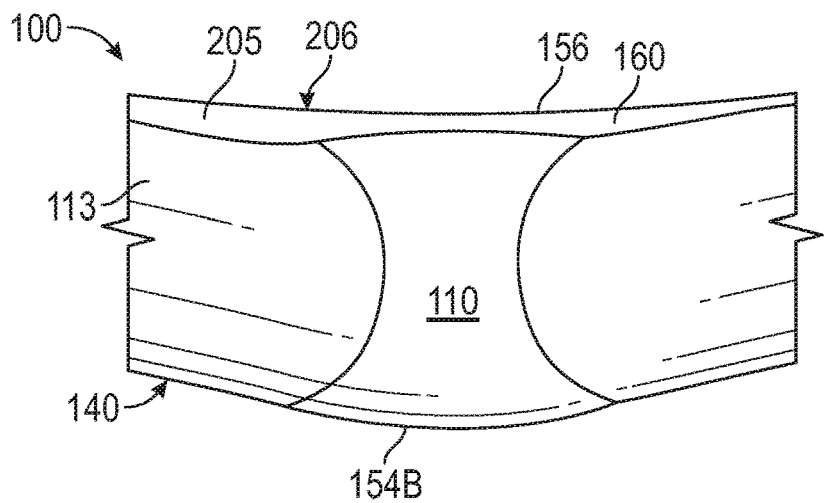
FIG. 10 is a close-up end view of the enhanced welded pipe of FIG. 9 after the two enhancement weld layers have been machined to achieve a uniform inside diameter.

FIG. 10 shows a closer view of pipe end 113 in the vicinity of seam 110 and weld enhancement 205 prior to the addition of threads. In FIG. 10, weld enhancement 205 has been machined to form an interior surface 206 that matches or substantially matches the ID circle 156 (FIG. 7) that describes the interior surface 142 on the remainder of pipe 100 (FIG. 2 and FIG. 7). Upon completion, interior surface 206 forms a portion of the pipe interior surface 142, blending smoothly (e.g. same diameter) with interior surface 142 and being a region of interior surface 142. The machining process may include cutting or grinding, as examples. Based on the results of machining the weld enhancement 205, the full circumference of pipe interior surface 142 at end 113 has a uniform inside diameter. This uniform region of surface 142 extends axially the length 210L to the weld enhancement end location 212 (FIG. 8). In FIG. 10, the machining has removed at least half of the thickness T of the two layers of weld enhancement 205, the remaining portion of weld enhancement 205 has a thickness of at most ½ T (one-half of thickness T). Thus, the machining of the weld enhancement 205 removed all of the second layer thickness T2, and, in at least some of these embodiments, machining removes a portion of the first layer thickness T1. Weld enhancement 205 continues to fill the previous gap 160 after being machined and has a non-uniform thickness because the thickness of the previous gap 160 (FIG. 6) was non-uniform. It is conceivable that the targeted thickness of weld enhancement 205 and the uniform interior surface 206, 142 could be achieved by removing a different portion of layer 210 or 220. For example, if outer layer 220 were thicker than inner layer 210, then only a fraction of the outer layer thickness T2 would be removed while none of the inner layer thickness T1 would be removed in such an embodiment. In FIG. 10, the outward bulge 154B remains on the exterior surface 140.

Thus, referring now to FIG. 8, FIG. 9, and FIG. 10, weld enhancement 205 has an axial length 210L, and extends circumferentially up to the arc length 208L of layers 210, 220. The extent of length 208L was previously described with respect to the features of pipe 150, welded seam 110, and gap 160. Due to the machining, the arc length of weld enhancement 205 may be somewhat less than the full arc length 208L of layers 210, 220. After machining, weld enhancement 205 spans circumferentially across the width 110W of seam 110 and across pipe wall portions 152A, 152B up to tangent points 156A, 156B, filling the previous gap 160. In some embodiments, weld enhancement 205 extends circumferentially beyond each side of the seam 110 by a distance of between 1.5% and 5%, inclusive, of the nominal circumference of pipe 100. These distances describe nearly one-half the arc length of enhancement 205. As an example, for some 20 inch diameter pipes or tubulars, enhancement 205 extends beyond each side of the seam 110 by a distance of between 1 and 3 inches, which is equivalent to an angular range of 5 to 17° (degrees). In some of these embodiments, enhancement 205 extends beyond each side of the seam 110 by a distance of 2 inches, which is equivalent to 3% of the circumference of the 20 inch diameter pipe, spanning an arc length of 12° (degrees). In some embodiments, weld enhancement 205 is contained within a total arc length spanning less than or equal to 45° but more than zero degrees. In some of these embodiments, weld enhancement 205 is contained within a total arc length of 10 to 20°.

Figure 11:
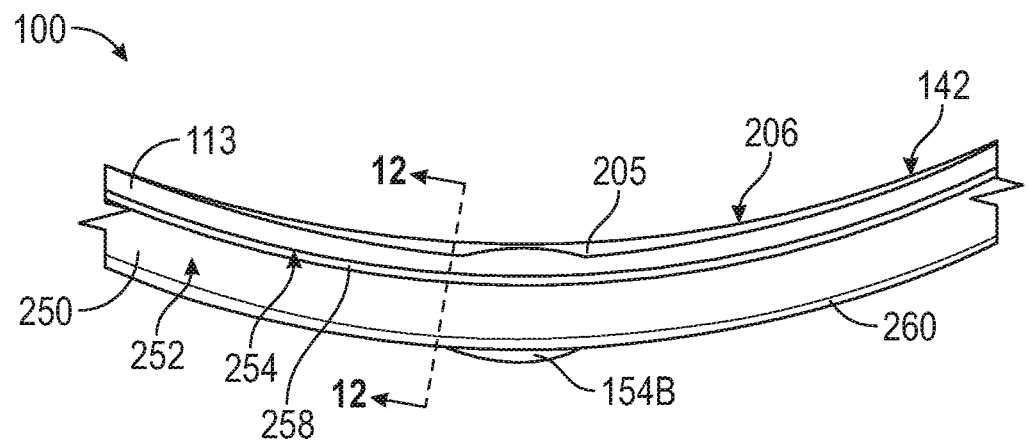
FIG. 11 is a partial end view of the enhanced welded pipe of FIG. 9 after another machining process ("blanking-in") is completed in preparation for machining threads.
Figure 12:
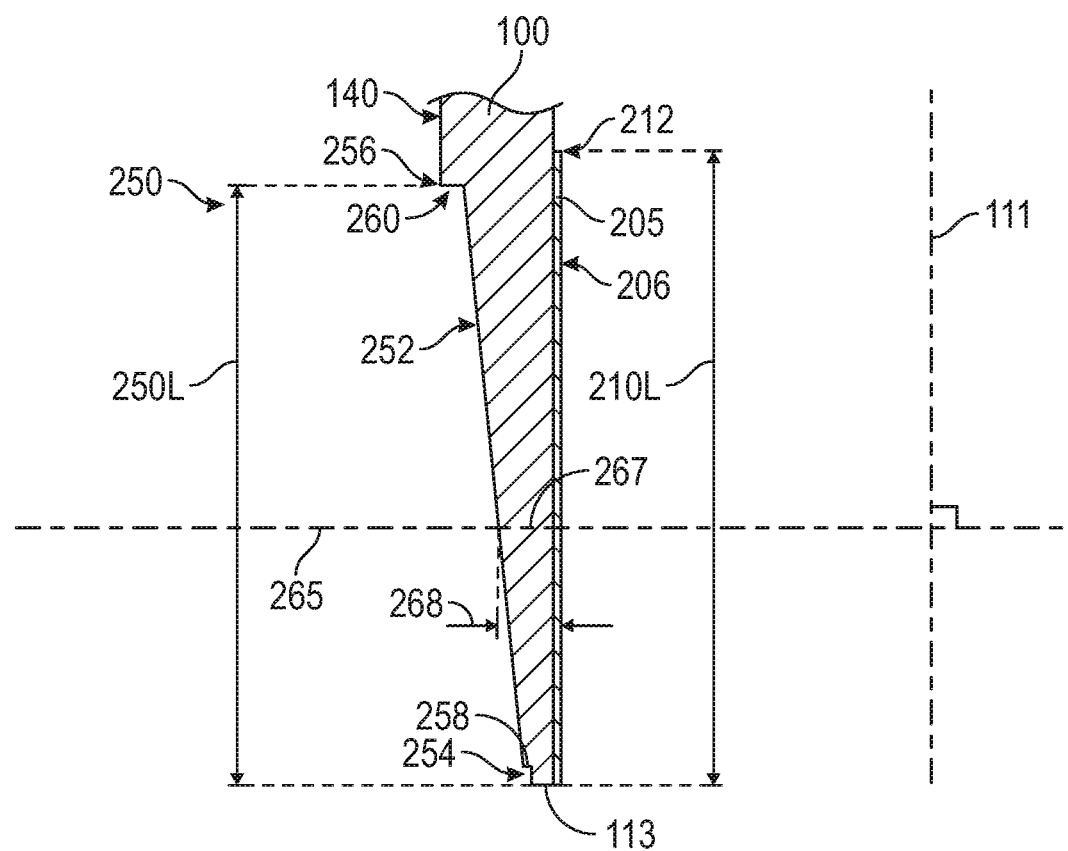
FIG. 12 is a cross-sectional side view of FIG. 11, showing the inner and outer surfaces that have been machined to achieve a uniform inside diameter and to prepare for machining threads; having a weld enhancement that is longer than the total machined length, in accordance with principles described herein.

FIG. 11 and FIG. 12 show a portion of pipe 100 at end 113 after another machining process is completed prior to machining threads for pin end 130. A "blanked portion" 250 has been formed. A portion of exterior surface 140 adjacent to pipe end 113 has been "blanked-in," reforming exterior surface 140 to include a tapered exterior surface 252, which lies at an acute angle and greater than zero degrees relative to axis 111, and a seal surface 254 extending axially from tube end 113 to surface 252. Blanked portion 250 of pipe 100 further includes a radially extending, annular first shoulder 258 that joins exterior surfaces 252, 254 and includes an annular second shoulder 260 extending radially from surface 252 to the remainder of pipe exterior surface 140. A majority of tapered exterior surface 252 is ultimately converted to the threads 136 of FIG. 4; while the uppermost portion of exterior surface 252 that is adjacent shoulder 260 remains smooth—non-threaded—to participate in exterior seal interface 139 of FIG. 4. Seal surface 254 of FIG. 12 is external and smooth—non-threaded—and participates in the interior seal interface 138, also shown in FIG. 4, being disposed between tube end 113 and threads 136. Continuing to reference FIGS. 11 and 12, the machined, exterior surfaces 252, 254 are substantially aligned axially with the machined interior surface 206, and extend around the circumference of pipe 100. Surface 252 is frustoconical, prepared for the threading of tapered, external threads. However, in some embodiments Surface 252 could be machined as a cylindrical surface for the machining of cylindrical threads. Seal surface 254 is depicted in FIG. 12 as being axially cylindrical but could be axially tapered or a combination of the two. In various embodiments, blanked portion 250 may be considered to extend radially inward to include at least a portion of weld enhancement 205, at least a portion of interior surface 206, and the circumferentially adjacent portion of interior surface 142. Blanked portion 250 extends an axial distance (length) 250L to an end location 256 where the second shoulder 260 extends between surface 252 and the remainder of pipe exterior surface 140. End location 256 represents a radially extending plane that is axially spaced from end 113. As shown in FIG. 12, the outward bulge 154B of welded seam 110 has been removed in the region of surfaces 252, 254, but it remains at locations that are axially beyond these blanked surfaces, unless additional machining is performed to remove that major portion of bulge 154B. In FIG. 12, weld enhancement 205 extends axially further than the blanked surfaces 252, 254. Therefore, weld enhancement length 210L is longer than the blanked length 250L in the example shown.

In some embodiments, length 210L of weld enhancement 205 is between 2 inches and 18 inches, measured axially from pipe end 113. For a particular group of these embodiments, weld enhancement length 210L is selected to be between 4 and 12 inches. In still other embodiments, the axial length 210L of weld enhancement 205 is less than 2 inches or greater than 18 inches, the maximum value of length 210L being limited by the reach capability of the equipment used to form and machine the weld enhancement 205 inside the tubular member. In some embodiments, seal surface 254 extends a length of approximately 1 inch measured axially from pipe end 113, overlapping a portion of weld enhancement 205. Other axial lengths of seal surface 254 are contemplated. Weld enhancement 205 extends parallel or approximately parallel to seal surface 254 in the circumferential direction.

Continuing to reference FIG. 12, the machining steps that form interior surface 206 and exterior surface 252, 254 configure the blanked portion 250 of pipe 100 to include a wall that tapers from a selected, minimum wall thickness at the pipe end 113 to a greater wall thickness at the axially spaced location 256. Even so, at any particular axial location between the pipe end 113 and the axially spaced location 256, blanked portion 250 has a uniform wall thickness in the circumferential direction. For example, a plane 265 perpendicular to axis 111 intersects blanked portion 250 to form an axial cross section 267 that is annular in shape and has wall thickness 268 that is uniform (i.e. constant) around the circumference of blanked portion 250. Reference is again given to FIG. 3 and FIG. 4, which show pipe end 113 after blanking and after threading. Due to weld enhancement 205, threaded pin end 130 has uniform wall thickness in the circumferential direction for any thickness measured radially at least from inner surface 142 to the root surface 136RS of threads 136.

Figure 13:
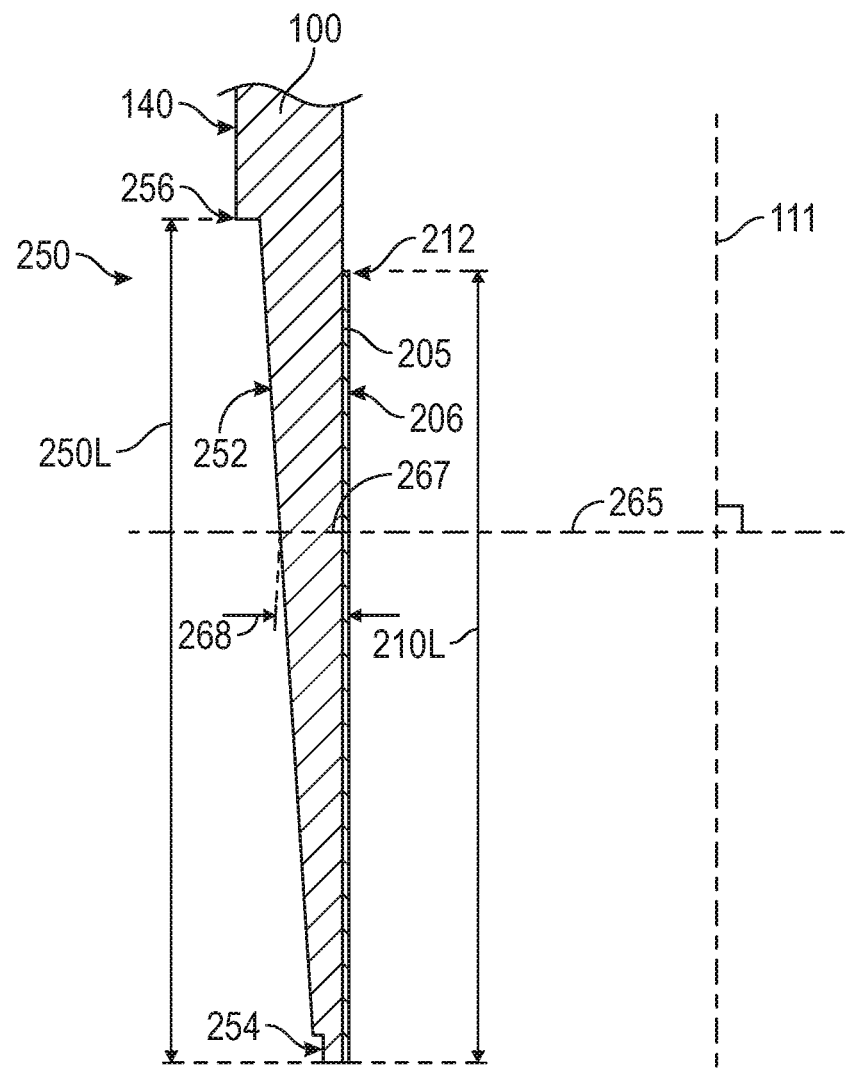
FIG. 13 is a cross-sectional view similar to FIG. 12, showing the inner and outer surfaces that have been machined to achieve a uniform inside diameter and to prepare for machining threads, having a weld enhancement that is shorter than the total machined length, in accordance with principles described herein.

Alternatively, FIG. 13 presents and embodiment having a blanked portion 250 with a blanked length 250L that is longer than the length 210L of a weld enhancement 205. Blanking-in of exterior surface 114 has been performed axially from the pipe end 113 to a location 256 axially spaced from the tube end 113 and axially beyond the weld enhancement 205. A uniform wall thickness 268 exists in any axial cross section formed by a plane 265 when plane 265 located between the pipe end 113 and the axially spaced location 212 at the furthest extent of weld enhancement 205. The uniform wall thickness 268 does not exist between location 212 and the axially spaced location 256 at the end of blanked portion 250. FIG. 13 is marked with various other features that are similar to features in FIG. 12. In some other embodiments, the blanked length 250L and the weld enhancement length 210L are equal.

Again referring to FIG. 12, to form interior surface 206, the pipe 100 that is to be worked may be installed or "chucked" on a first machine that performs a milling process, such as a lathe or milling machine. To blank the exterior surface 140, forming surfaces 252, 254, 258, 260 the same pipe 100 may be installed or "chucked" on a second machine that performs another milling process.

Alternatively, the machining steps that form interior surface 206 and exterior surfaces 252, 254, 258, 260 of blanked portion 250 of pipe 100 may be performed on a single machine, using a single-chucking. That is to say the pipe 100 that is being worked may be installed once prior to forming the interior surface 206 and exterior surfaces 252, 254, 258, 260 in the same or sequential operation(s). Using a single-chucking during machining is beneficial for achieving a round blanked portion 250 and ultimately a round pin end 130 with minimal or no out-of-roundness. Thus, using a single chucking controls or reduces out-of-roundness. In some cases, the threads 136 will be added during the single-chucking procedure.

Figure 14:
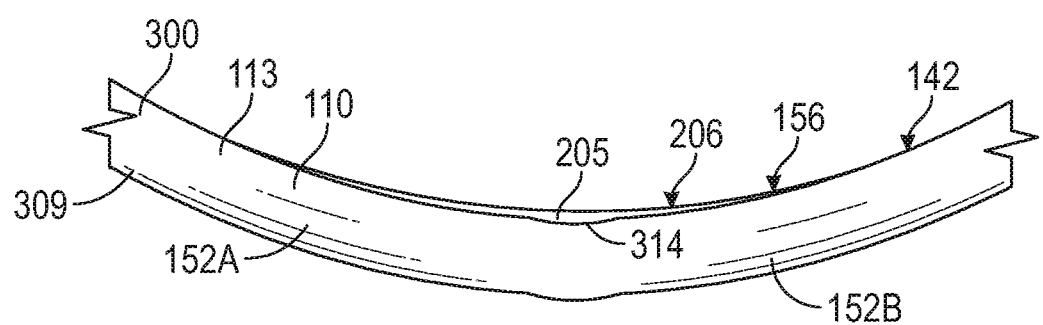
FIG. 14 is a partial end view of another enhanced welded pipe that has been machined to achieve a uniform inside diameter and may be used to form the enhanced welded pipe of FIG. 2, in accordance with principles described herein.

Referring now to the partial end view FIG. 14, an enhanced welded tubular member 300, configured in accordance with the principles described herein. Shown prior to blanking-in and threading, tubular member 300 includes a tube or tubular body 309, an end 113, exterior surface 140, an interior surface 142, and first and second welded portions 152A, B coupled at a weld or welded seam 110. An inner circle 156 follows the inner surface and inside diameter of the majority of member 300, except in the region of the flat portions 152A, B, which extend outside the circle 156. Tubular member 300 also includes a patch of weld material, i.e. a weld enhancement 205, spanning across seam 110, and thus, member 300 is an enhanced welded tubular. Weld enhancement 205 has the characteristics previously described for weld enhancement 205, except, in FIG. 11, weld enhancement 205 is thicker proximal seam 110 due to the inclusion of a concave region 314 on the inner surface of seam 110. Region 314 may be formed by grinding or by another machining process prior to the addition of weld enhancement 205. Region 314 extends below (radially outward) the interior surfaces of welded portions 152A, B. As shown, weld enhancement 205 has been machined to form a curved interior surface 206 that substantially matches the ID circle 156, which describes the interior surface 142 on the remainder of member 300, resulting in a configuration similar to end 113 of welded pipe 100 in FIG. 10. Member 300 differs from pipe 100 by the inclusion of the concave region 314 in seam 110 and by the increased thickness of weld enhancement 205 adjacent the region 314. Whereas enhancement 205 of welded pipe 100 has a thin region in the vicinity of seam 110 (FIG. 10); weld enhancement 205 of member 300 does not have a thinner region in the vicinity of seam 110, potentially providing greater strength to member 300. In some other embodiments, an enhanced tubular member includes a welded seam that is machined to be curved and substantially flush with the interior surfaces of welded portions 152A, B prior to the addition of a weld enhancement. In subsequent operations for various embodiments, end 113 of tubular member 300 of FIG. 14 is blanked and threads are added, as described with respect to welded pipe 100. When threaded, a member 300 may be coupled to another member 300 or to a pipe 100 having compatible threads in order to form a threaded connection, such threaded connection 105 shown in FIG. 1.

Referring again to FIG. 1 and FIG. 2, the pin ends 130 of the enhanced welded pipes 100 are configured to participate in threaded connections 105 without buckling based on the strength gained from weld enhancement 205. The pipe 100 having a weld enhancement 205 and the threaded connection 105 formed between two pieces of pipe 100 are configured to hold up to 5,000 psig of pressure, that is to say, configured to hold a pressure differential between the inside and the outside of pipe 100 of up to 5,000 psig. A high pressure fluid on the inside of the pipe is one example of a cause for a pressure differential between inside and the outside of pipe. For some embodiments, a threaded connection 105 formed between two pieces of pipe 100 having a weld enhancement 205 is configured to hold up to 8,000 psig of pressure. The targeted pressure range for some embodiments is between 5,000 and 8,000 psig. It is contemplated that as the methods, apparatus, and principles disclosed herein are applied in the art, embodiments of enhanced welded pipes and their threaded connections may achieve a capability to hold over 8,000 psig. Other tubulars having a weld enhancement 205 may be configured with a goal of holding a lower pressure, for example, a pressure of up to 1,000 psig. Enhanced welded tubular members formed in accordance with principles disclosed herein may be tested under compression, tension, and bending, as examples, to determine, confirm, or estimate a strength of the member. The enhanced welded pipe 100 may cost less to produce than does a comparable commercially available pipe having threaded fittings that are welded to the end of unthreaded pipe-stock.

Figure 15:
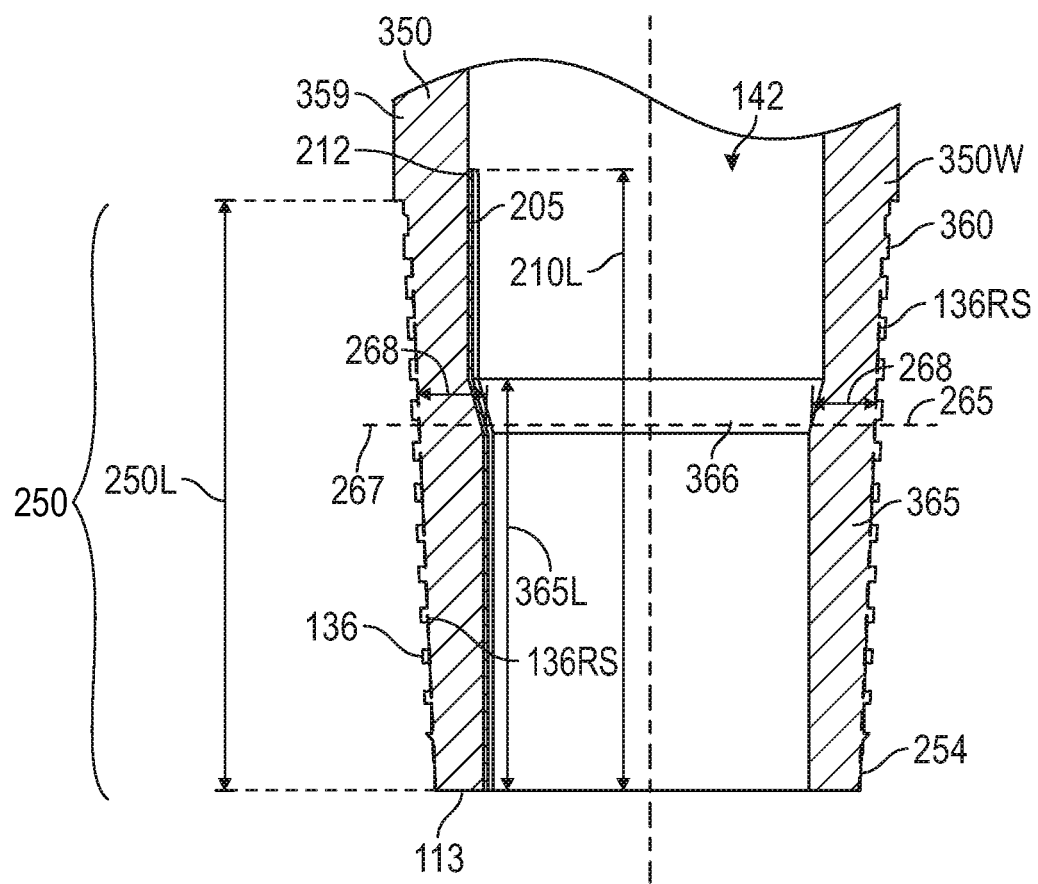
FIG. 15 is a cross-sectional side view of a weld-enhanced pin end that includes a swage in accordance with principles described herein.

As an example of swaging, FIG. 15 shows a cross-sectional side view of a welded tubular member or pipe 350 having a tube or tubular body 359 with a threaded male or pin end connector 360 that includes a weld enhancement 205 and a swage 365. Swaged pipe 350 may replace a pipe 100 in well system 1 of FIG. 1. Swage 365 extend circumferentially around pin end 360 for an axial distance of 365L from tube end 113 of enhanced welded pipe 350 having a smooth, external seal surface 254. The cross-section of FIG. 15 is taken adjacent the longitudinal or spiral weld of pipe 350 such that the weld is not visible in this view. Weld enhancement 205 extends from tube end 113 to an axially-spaced, end location 212. The axial length 210L of weld enhancement 205 is longer than swage length 365L in this example. Enhancement length 210L is also longer than length 250L of blanked portion 250, and axially longer than external threads 136 that are formed around blanked portion 250. Swage 365 extends for approximately half of the axial length of threads 136 in this example. Threads 136 include a root surface 136RS. Distal the tubular end 113, swage 365 includes a transitional portion 366 in which the wall thickness of pin end 360 is increased and the pipe's inside diameter is reduced as swage 365 extends toward end 113. For any axial location between tubular end 113 and end location 212 of enhancement 205, the wall 350W of pipe 350 will have a uniform thickness around the circumference of pipe 350; although that wall thickness varies depending on the axial location. As one example, a uniform wall thickness 268 exists in pipe wall 350 at a plane 265. The uniform wall thickness 268 extends radially from inner surface 142 of pin end 360 to root surface 136RS of threads 136. In FIG. 15, transitional portion 366 is located entirely inside the threaded region and spans the axial length of a few threads. In some embodiments, transitional portion 366 is more gradual, spanning the axial length of many more threads, possibly the axial length of one quarter or one half of the threads 136, as examples. In some embodiments, transitional portion 366 and swage length 365L extend into the pipe beyond the end of the threads 136.

Figure 16:
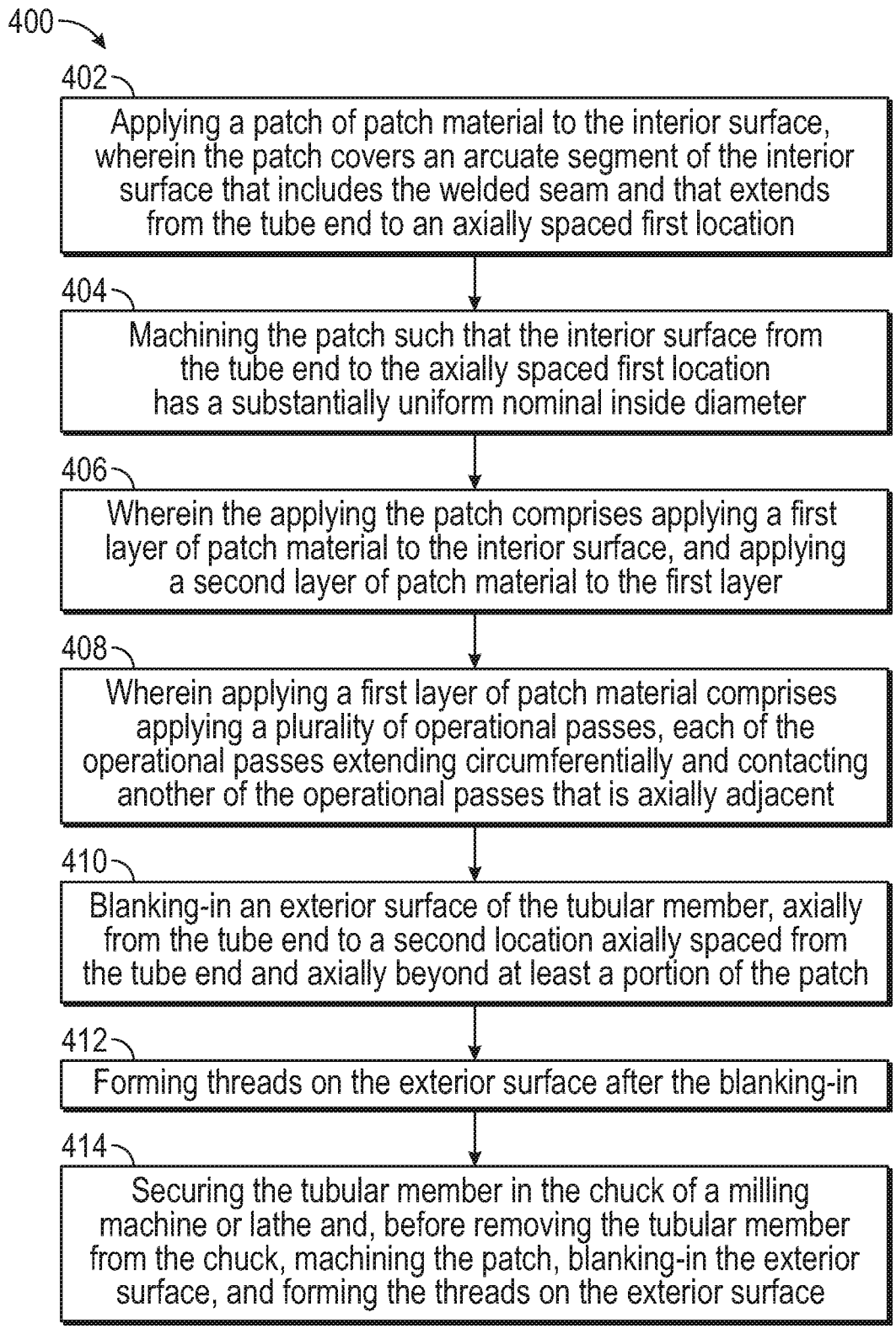
FIG. 16 shows a method for forming an enhanced welded pipe, in accordance with principles described herein.

FIG. 16 shows a method 400 for fabricating an enhanced welded pipe or another tubular member in accordance with the principles described herein. At block 402, method 400 includes applying a patch of a material to the interior surface of tubular member, wherein the patch covers an arcuate segment of the interior surface that includes an axially extending welded seam and that extends from the tube end to an axially spaced first location. Block 404 includes machining the patch such that the interior surface from the tube end to the axially spaced first location has a uniform nominal inside diameter. Block 406 includes wherein the applying of the patch comprises applying a first layer of a material to the interior surface, and applying a second layer of the material to the first layer. Block 408 includes wherein applying a first layer of material comprises applying a plurality of operational passes (referring to a region or portion of deposited material, however applied), each of the operational passes extending circumferentially and contacting another of the operational passes that is axially adjacent. Block 410 includes blanking-in an exterior surface of the tubular member, axially from the tube end to a second location axially spaced from the tube end and axially beyond at least a portion of the patch. The second location is selected from among the following group: the first location, a position between the tube end and the first location, and a position axially beyond the first location as measured from the tube end. Block 412 includes machining threads on the exterior surface after the blanking-in. Block 414 includes securing the tubular member in the chuck of a milling machine or lathe and, before removing the tubular member from the chuck, machining the patch, blanking-in the exterior surface, and machining the threads on the exterior surface.

For welded metal pipe, for example, the material of the patch may be a metal having properties similar to the properties of the tube body or the welded seam of the pipe. In some embodiments of method 400, the material of the patch is weld material, and applying the patch results in forming a weld enhancement, such as weld enhancement 205 described above. In some of these embodiments, applying the patch in Block 406 comprises welding a first layer of weld material to the interior surface, and welding a second layer of weld material to the first layer. The operational passes in Block 408 are weld passes for these embodiments.

In various embodiments, method 400 includes specifying the welding heat input for the weld passes 208 of the first layer 210 and the heat input for the weld passes 208 of the second layer 220. As described previously, the heat input may be varied while producing a weld enhancement on a piece of welded tubular.

In an embodiment, the method 400 includes preparing an end of a welded pipe to receive additional welding material, selecting a particular welding material as described herein, applying a first layer of multiple, adjacent weld passes extending perpendicular to the original weld of the pipe, applying a second layer of multiple, adjacent weld passes over the first layer, and machining the layers of weld material to achieve a substantially uniform inside diameter for the end of the welded pipe. Thus, the principles disclosed herein produce an improved or corrected geometry for the enhanced welded tubular in the region of a weld enhancement 205. Another aspect of the principles disclosed herein is the selection of a preferred welding material and the selection of one or more preferred heating input levels for the welding process.

In an embodiment, the method 400 includes swaging the pin end 130 of tubular member 100 adjacent to the tube or pipe end 113. The swaging adds a swage, which may be described as an annular, expanded or contracted region, to increase the connection strength of tubular member 100. Swaging is typically performed after the addition of the patch or weld enhancement 205 in order to strengthen the tubular end, facilitating uniform deformation during the swaging operation. Swaging is performed before the creation of blanked portion 250 and the threads 136. The patch or weld enhancement 205 extends axially at least as far from the pipe end 113 as the axial location of the swage that is formed by the swaging. For a swaged pipe end, weld enhancement 205 preferably extends at least the full axial length of the threads, similar to the example of FIG. 16. In an embodiment, the swage is formed at an axial location corresponding to seal surface 254, and in another embodiment, the swage is formed at an axial location beyond the seal surface 254, further from pipe end 113. In some embodiments of the method, after swaging, the inside diameter of the swaged pipe end is inspected or re-cut to insure a uniform inside diameter along at least a portion of the swage.

Various embodiments of method 400 may include fewer operations than described. Various other embodiments of method 400 include additional operations based on any of the concepts presented in this specification, including the figures. In some instances, a manufacturing or operational or a scheduling advantage is gained by choosing specific sequences for various operations of method 400, sequences that differ from FIG. 16.

Referring now to FIGS. 17 to 20, in some instances, a weld enhancement is added to a box end in order to prepare it for swaging, which usually involves outward expansion of the box end prior to blanking-in and adding threads. In various embodiments, method 400 is applied to form a weld-enhanced box end.

Figure 17:
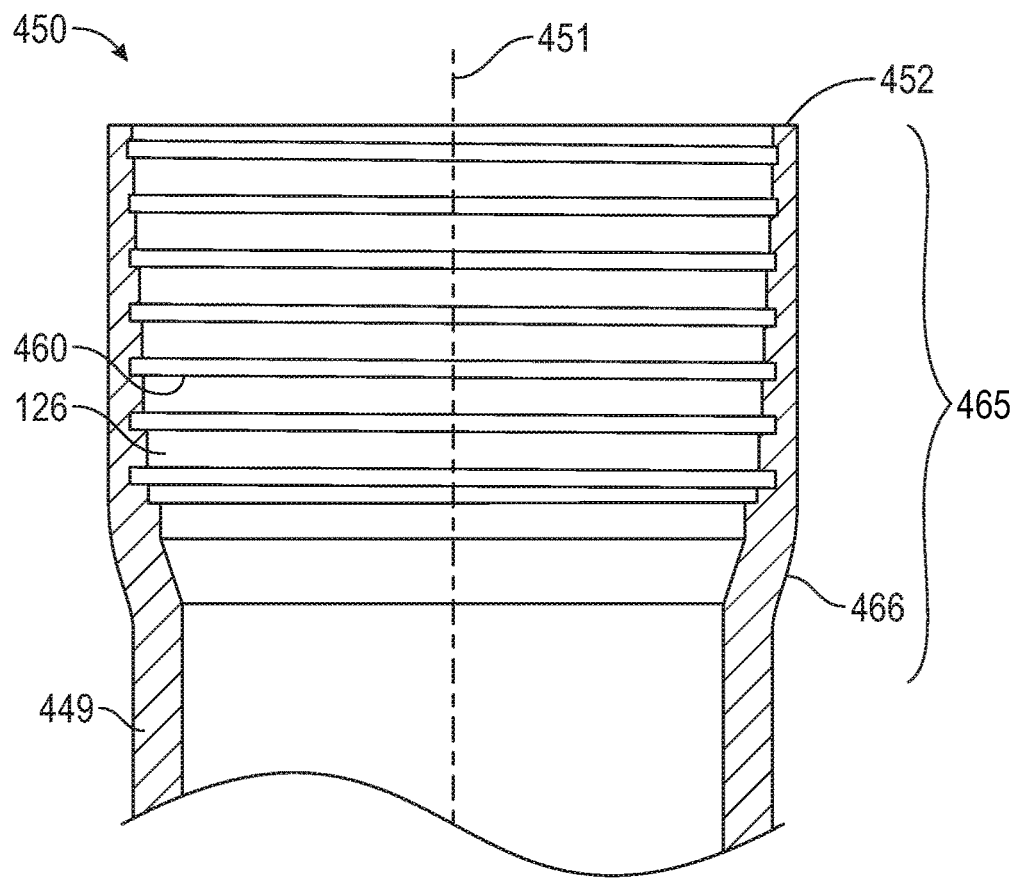
FIG. 17 is a cross-sectional side view of a threaded box end formed on a swaged end of an enhanced welded pipe in accordance with principles described herein.

FIG. 17 shows a welded tubular member or pipe 450 that includes a tube or tubular body 449 extending along a central or longitudinal axis 451, an interior surface 454, an end 452, and a box end connector 460, which may simply be called a "box end 460" or a "box 460." Box 460 includes internal threads 126 that are configured as described elsewhere herein and includes a swage 465, which extends from a tapered, transitional portion 466 to the pipe end 452. Swage 465 and the box end 460 have a larger inside diameter than the adjacent portion of pipe 450. Threads 126 are located in the swage 465 extending inward from end 452 toward transitional portion 466. Box end 460 may replace a pipe 100 in well system 1 of FIG. 1 and may be threadingly coupled with pin end 130 of another pipe 100 in FIG. 3. Box end 460 may be threadingly coupled with any other pin end disclosed herein.

Figure 18:
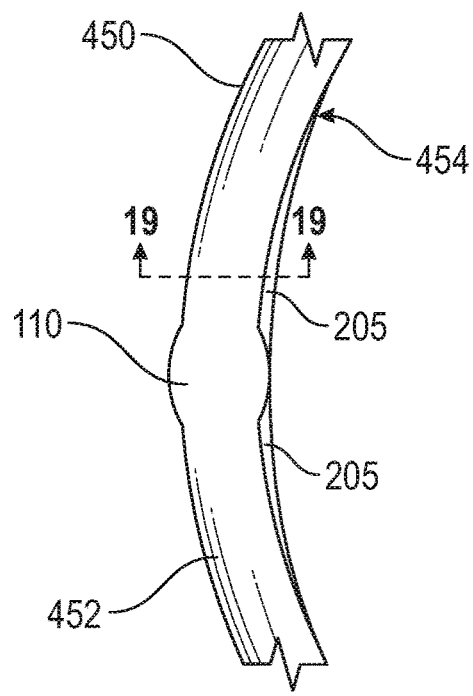
FIG. 18 is a partial end view of the enhanced welded pipe used to form the box end of FIG. 17, the pipe shown after a machining process that formed a uniform inside diameter.
Figure 19:
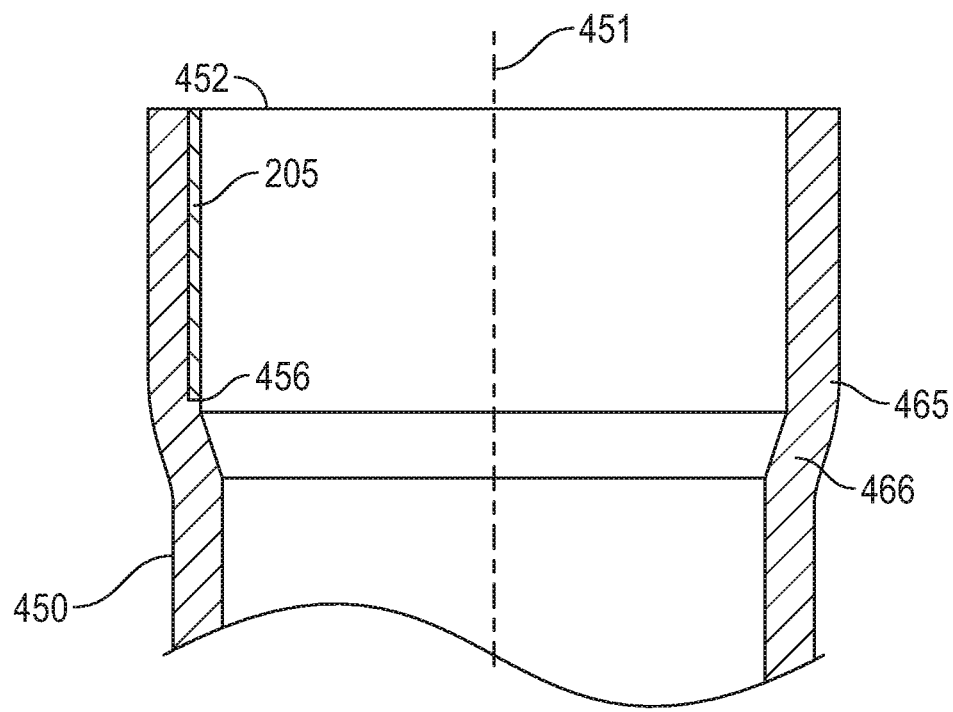
FIG. 19 is a cross-sectional side view of the enhanced welded pipe of FIG. 18 after swaging is completed.

To form box end 460, the interior surface 454 of pipe 450 is weld-enhanced using a process described above for pipe 100 and well enhancement 205 in FIG. 9 or according to other principles described herein. Referring to FIG. 18, after applying a weld enhancement or patch 205 near the end 452, the interior surface 454 of pipe 450, including enhancement 205, is machined to achieve a uniform inside diameter (ID). As best shown in FIG. 19, weld enhancement 205 extends to an end location 456 axially spaced from end 452, and the machined ID extends at least to location 456. Referring again to FIG. 18, in this instance, sufficient portion of welded material has been removed so that the longitudinal or spiral welded seam 110 is exposed again on interior surface 454, and enhancement 205 is divided into two parts, one on either side of seam 110. Next, as shown in FIG. 19, the end 452 of pipe 450 is swaged, expanded outward. The tapered, transitional portion 466 of swage 465 is located axially-beyond weld enhancement 205 so that all of weld enhancement 205 and an additional length of pipe 450 have been swaged. In some embodiments, weld enhancement 205 extends axially beyond portion 466 or extends circumferentially across weld seam 110 even after interior surface 454 is machined to a uniform ID.

Figure 20:
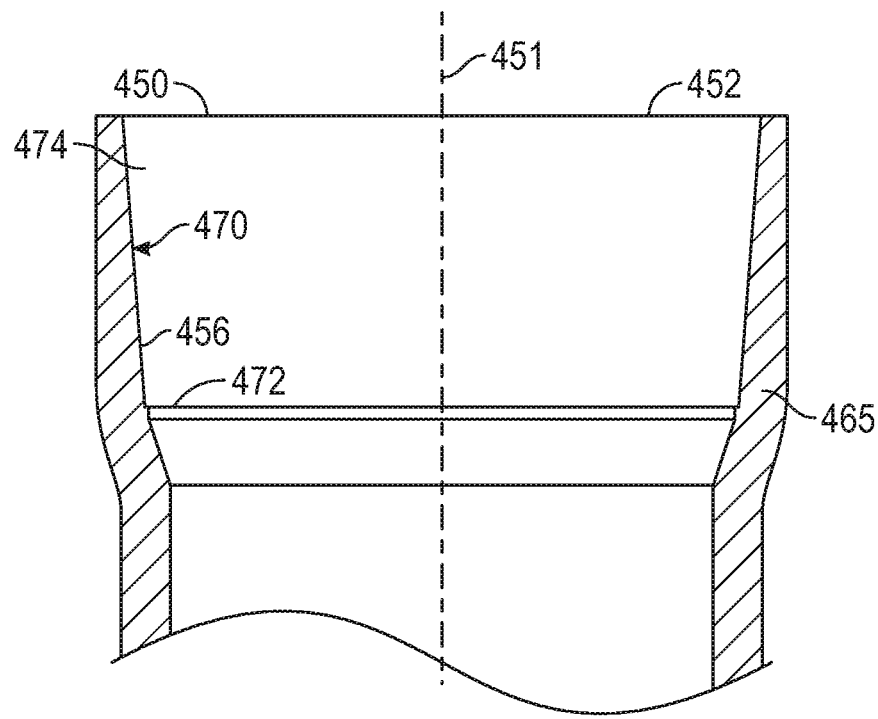
FIG. 20 shows the same view of the pipe of FIG. 19 after "blanking-in" is completed in preparation for machining threads.

FIG. 20 shows the end 452 of pipe 450 after another machining process is completed prior to machining threads for box end 460. A portion of the interior surface within the swaged portion of pipe 450 has been machined or "blanked-in" to include a tapered interior surface 470 and a shoulder 472 that is generally adjacent the swage transitional portion 466. Tapered surface 470 lies at an acute angle and greater than zero degrees relative to axis 451. Inner surface 470 has a uniform diameter at any location along axis 451. In this manner, a "blanked portion" 474 has been formed within swage 465, extending from end 452 toward portion 466, in some instances overlapping some of portion 466. In FIG. 20, the blanking-in process has removed from 90 to 100% of weld enhancement 205. In some embodiments, blanking-in removes less than 90% of the material of enhancement 205. Subsequent to blanking-in, internal threads 126 are added to achieve the box end configuration of FIG. 17. Threads 126 include a root surface 126RS. Further, in some embodiments, the outer surface of pipe 450 at end 452, including at least weld seam 110, is machined to achieve a uniform outside diameter (OD) from end 452 to the axial position of location 456 or farther, which results in a uniform wall thickness around the circumference of pipe 450 at any axially position from end 542 to location 456. After threads 126 are added, the uniform wall thickness extends radially at least from the machined, outer surface of pipe 450 to the root surface 126RS.

In some embodiments, in place of a weld enhancement 205, a similar enhancement or patch is laid-down by one of various metal deposition techniques across a welded seam of a tubular member. Metal spray and vapor deposition are examples of metal deposition techniques. As an example, a metal deposition technique can be utilized in method 400 of FIG. 16 to form the patch of material described above. The method of achieving operational passes or forming multiple layers for the patch may depend on the type of metal deposition technique selected. In some embodiments, the patch of material formed by metal deposition has the same dimensions or properties as previously described for weld enhancement 205.

Examples of various embodiments have been presented. Variations leading to additional embodiments are possible. Some such variations are discussed here, but this discussion is not exhaustive.

Referring again to FIGS. 3, 5, and 8 as examples, although welded seam 110 and weld enhancement 205 were described as extending linearly and axially, other orientations are possible. For example, in some embodiments, welded seam 110 or weld enhancement 205 extends as a spiral along the length of a tubular member.

In some embodiments, the patch of weld material, i.e. the weld enhancement 205, may be formed by just the single layer 210 shown in FIG. 7 and FIG. 8, which is then ground down to form a uniform, circular inner surface for a tubular member like pipe 100.

In the discussion above, the goal and the result of machining the weld enhancement 205 has been to achieve a uniform inside diameter around the full circumference of pipe interior surface 142 at end 113, as shown in FIG. 10. Even so, in some embodiments, a tubular member includes a weld enhancement that extends axially inward beyond the remainder of interior surface 142 even after threads are applied to the exterior surface to form the pin end. Even in these embodiments like those described earlier, the weld enhancement fills an offset or gap on the inside surface of a tubular member along a weld and provides strength to this portion of pipe to resist compressive hoop stress. Strengthening a tubular member to resist greater compressive hoop stress is particularly helpful after the outer surface of the pipe is machined thinner (e.g. "blanked") in order to receive the threads and adjoining metal seal, threads and seal interface region are added, and the tubular member is later mated in a threaded connection.

Although, the weld passes 208 that form the first and second layers 210, 220 of FIG. 8 and FIG. 9 have been described as extending circumferentially, some embodiments may instead include one or more layers of weld passes that extend axially and are spaced circumferentially. So too, for some embodiments, the weld passes may be applied at another angle, i.e. diagonally with respect to the wall of the welded seam that they cover. The two layers 210, 220 may have weld passes that extend in different directions. A greater or lesser increase in the strength of the pipe may be achieved when weld passes are oriented differently than shown in FIG. 9.

Threaded connection 105 in FIG. 4 was shown to have an interior seal interface 138 and also an exterior seal interface 139, both formed by interference fits between pairs of smooth, non-threaded surfaces. However, various other embodiments having an enhancement such as weld enhancement 205 include only an interior seal interface 138, only an exterior seal interface 139, or neither seal 138, 139 that is formed separate from threaded regions.

While exemplary embodiments have been shown and described, modifications thereof can be made by one of ordinary skill in the art without departing from the scope or teachings herein. The embodiments described herein are exemplary only and are not limiting. Many variations, combinations, and modifications of these embodiments or their various features are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. To the extent feasible, the steps or operations of a method may be performed in any order, except for those particular steps or operations, if any, for which a sequence is expressly stated. In some implementations two or more of the method steps or operations may be performed in parallel, rather than serially.

What is claimed is:

1. A method for modifying a tubular member having a tube end, an exterior surface, an interior surface, a nominal wall thickness, a central axis, and a welded seam, wherein the welded seam forms a portion of the interior surface, the method comprising:

applying an arcuate patch of weld material to the interior surface, wherein the patch covers an arcuate segment of less than an entire circumference of the tubular member along the interior surface at the location of the arcuate patch, wherein the arcuate segment includes the welded seam and extends axially from the tube end to an axially spaced first location; and machining the patch such that the interior surface of the tubular member from the tube end to the axially spaced first location has a uniform inside diameter.

2. The method of claim 1 wherein the patch is machined such that, in an axial cross section of the tubular member taken between the tube end and the axially spaced first location, the wall thickness is uniform around the circumference of the tubular member.

3. The method of claim 2 further comprising: blanking-in the exterior surface by machining the tubular member to taper from a minimum wall thickness adjacent the tube end to a greater thickness at a second location that is axially spaced from the tube end.

4. The method of claim 3 further comprising: machining threads on the exterior surface after blanking-in the exterior surface;
   wherein the threads include a root surface; and
   wherein the uniform wall thickness extends radially at least from interior surface to the root surface.

5. The method of claim 4 further comprising: securing the tubular member in a machine and, before removing the tubular member from the machine, machining the patch, blanking-in the exterior surface, and machining the threads on the exterior surface.

6. The method of claim 4 wherein the method further comprises: engaging threadingly a pin end of a first tubular member and a box end of a second tubular member;
   wherein engaging threadingly includes forming a circumferentially extending interference fit between a non-threaded portion of the pin end and a non-threaded portion of the box end, the non-threaded portion of the pin end including a portion of the patch.

7. The method of claim 6 wherein the outside diameter of the box end is the same as the outside diameter of the first tubular member.

8. The method of claim 6 wherein the outside diameter of the box end of the second tubular member is greater than the outside diameter of the first tubular member.

9. The method of claim 8 wherein the box end comprises a forging that is welded to a non-threaded end of the second tubular member.

10. The method of claim 1 wherein applying the patch comprises welding a first layer of weld material to the interior surface, and welding a second layer of weld material to the first layer.

11. The method of claim 10 wherein, measured radially, the first layer has a thickness T1 before machining the patch, and the second layer has a thickness T2 before machining the patch; and
    wherein machining the patch removes all of T2 and a portion of T1.

12. The method of claim 10 wherein welding the first layer is performed at a first heat input; and
    wherein welding the second layer is performed at a second heat input that differs from the first heat input.

13. The method of claim 10 wherein applying a first layer of weld material comprises applying a plurality of weld passes, each of the weld passes contacting another of the weld passes that is adjacent.

14. The method of claim 13 wherein each of the weld passes extends circumferentially and contacts another of the weld passes that is axially adjacent.

15. The method of claim 10 wherein the patch comprises a pair of circumferentially spaced ends, and a radial thickness; and
    wherein machining the patch comprises tapering the radial thickness of the patch at the circumferentially spaced ends.

16. The method of claim 15 wherein tapering the radial thickness of the patch comprises tapering the radial thickness of the patch so that an inner surface of the patch is flush with the interior surface of the tubular member at the circumferentially spaced ends.

17. The method of claim 16 wherein the machining comprises machining the inner surface of the patch to be disposed at the uniform inside diameter with a remaining portion of the interior surface of the tubular member that is not covered by the patch.

18. The method of claim 17 wherein the tubular member comprises a uniform wall thickness around the circumference.

19. The method of claim 1 wherein applying the patch comprises welding the patch using a heat input not greater than 50 kilo-Joules per inch of weld length.

20. The method of claim 1 further comprising: blanking-in the interior surface by machining the tubular member to taper from a minimum wall thickness adjacent the tube end to a greater thickness at a second location that is axially spaced from the tube end; and
    machining threads on the interior surface after blanking-in the interior surface.

21. The method of claim 1 further comprising: swaging the tubular member adjacent the tube end, resulting in the tube end being expanded in diameter.

22. The method of claim 1 further comprising: swaging the tubular member adjacent the tube end, resulting in the tube end being contracted in diameter.

23. The method of claim 1 wherein the patch comprises a pair of circumferentially spaced ends, and a radial thickness, and wherein machining the patch comprises machining the patch to taper the radial thickness at the circumferentially spaced ends.

24. The method of claim 23 wherein applying the patch comprises welding a first layer of weld material to the interior surface, and welding a second layer of weld material to the first layer.

25. The method of claim 24 wherein welding the first layer of weld material comprises applying a plurality of weld passes, each of the weld passes contacting another of the weld passes that is axially adjacent.

26. The method of claim 25 wherein machining the patch comprises tapering the radial thickness of the patch so that an inner surface of the patch is flush with the interior surface of the tubular member at the circumferentially spaced ends.

27. The method of claim 23 further comprising:
    blanking-in the interior surface by machining the tubular member to taper from a minimum wall thickness adjacent the tube end to a greater thickness at a second location that is axially spaced from the tube end; and
    machining threads on the interior surface after blanking-in the interior surface.

28. The method of claim 1 wherein the patch comprises a pair of circumferentially spaced ends, and a radial thickness, and wherein machining the patch comprises machining the patch to taper the radial thickness at circumferentially spaced ends so that an inner surface of the patch is flush with the interior surface of the tubular member at the circumferentially spaced ends.

29. The method of claim 28 wherein the machining comprises machining the patch such that, in an axial cross section of the tubular member taken between the tube end and the axially spaced first location, the wall thickness is uniform around the circumference of the tubular member.

30. The method of claim 29 further comprising:
    blanking-in the exterior surface by machining the tubular member to taper from a minimum wall thickness adjacent the tube end to a greater thickness at a second location that is axially spaced from the tube end; and
    machining threads on the exterior surface after blanking-in the exterior surface;
    wherein the threads include a root surface; and wherein the wall thickness extends radially at least from interior surface to the root surface.

31. The method of claim 30 wherein the method further comprises: engaging threadingly a pin end of a first tubular member and a box end of a second tubular member;

wherein engaging threadingly includes forming a circumferentially extending interference fit between a non-threaded portion of the pin end and a non-threaded portion of the box end, the non-threaded portion of the pin end including a portion of the patch.

32. The method of claim 28 wherein the machining comprises machining the inner surface of the patch to be disposed at the uniform inside diameter with a remaining portion of the interior surface of the tubular member that is not covered by the patch.

33. The method of claim 32 further comprising: swaging the tubular member adjacent the tube end, resulting in the tube end being expanded in diameter.

34. The method of claim 32 further comprising: swaging the tubular member adjacent the tube end, resulting in the tube end being contracted in diameter.

\* \* \* \* \*